US008855290B1

(12) United States Patent
Madabhushi et al.

(10) Patent No.: US 8,855,290 B1
(45) Date of Patent: Oct. 7, 2014

(54) SHARED CALL STACK IN A COMMUNICATIONS SYSTEM

(75) Inventors: Pramod Madabhushi, Austin, TX (US); Chakradhar Kondapalli, Austin, TX (US); Glenn Hessler, Austin, TX (US)

(73) Assignee: ShoreTel, Inc., Sunnyvale, CA (US)

( * ) Notice: Subject to any disclaimer, the term of this patent is extended or adjusted under 35 U.S.C. 154(b) by 746 days.

(21) Appl. No.: 12/814,257

(22) Filed: Jun. 11, 2010

Related U.S. Application Data

(60) Provisional application No. 61/262,063, filed on Nov. 17, 2009.

(51) Int. Cl.
*H04M 3/42* (2006.01)
(52) U.S. Cl.
USPC ............. 379/211.01; 379/211.02; 379/214.01
(58) Field of Classification Search
USPC .......... 379/67, 165, 212, 214, 233, 70, 93.35, 379/100.05, 171, 211.01, 211.02, 214.01, 379/218.02
See application file for complete search history.

(56) References Cited

U.S. PATENT DOCUMENTS

| 7,936,745 | B1 | 5/2011 | Tovino et al. | |
| 7,940,906 | B2 | 5/2011 | Basart et al. | |
| 7,991,150 | B2 | 8/2011 | Basart et al. | |
| 2001/0024492 | A1* | 9/2001 | Tanaka et al. | 379/156 |
| 2006/0067300 | A1* | 3/2006 | Poustchi et al. | 370/352 |

* cited by examiner

*Primary Examiner* — Khai N Nguyen
(74) *Attorney, Agent, or Firm* — Patent Law Works LLP

(57) ABSTRACT

A monitoring device 132 provides a shared call stack to a monitored extension and one or more proxy extensions. For example, the monitored extension is a boss' extension in a business environment, and the proxy extension is an extension for a boss' secretary. The monitoring device 132 detects an incoming call for the monitored extension. The incoming call is redirected, by the monitoring device 132, to a shared extension that is associated with the monitored extension. The shared extension has a shared call stack. The shared call stack has a call stack position that is shared with a proxy extension. The incoming call is made available as a call option in the call stack position so that the monitored extension and the proxy extension can user the monitoring device to perform call functions on the incoming call. The monitoring device can also perform call functions on outgoing calls.

21 Claims, 27 Drawing Sheets

FIG. 10

SHARED CALL STACK IN A COMMUNICATIONS SYSTEM

CROSS-REFERENCE TO RELATED APPLICATION

This application claims priority under 35 U.S.C. §119(e) to U.S. provisional patent application No. 61/262,063 entitled "Boss/Secretary," filed Nov. 17, 2009, which is incorporated herein by reference in its entirety.

TECHNICAL FIELD

This invention relates generally to IP telephony systems, and more particularly, to features associated with a shared call stack in a communications system.

BACKGROUND

The ability for one person to monitor another person's extension is useful in a variety of situations. For example, a secretary can monitor a boss' extension, including whether the extension has a call offering or is in use. It is also useful if the monitoring party (e.g., the secretary) can perform call functions on a call destined for a monitored extension. These functions can include, for example, answering the call, transferring the call, placing the call on hold and sending the call to voicemail.

While extension monitoring exists in traditional, keyed telephone systems, existing systems are not capable of allowing a boss extension to share a portion of the boss' call stack with a secretary extension so that the secretary can perform call functions on calls in the boss' call stack. Also not present in existing systems is an ability of the secretary extension to reconfigure the device associated with the boss' extension.

SUMMARY OF THE INVENTION

A monitoring device 132 implements a shared call stack in a telephony communications system. In one embodiment, the monitoring device 132 is a switch or server communicatively coupled to one or more endpoints such as IP-based phones, software phones and/or mobile phones. In another embodiment, the monitoring device 132 comprises an extension monitor module, a bridged call appearance module, a configuration module, a hotline module, a graphical user interface device interface module and a mobile call appearance module.

One user's extension (the "monitored extension") is associated with a shared extension. The shared extension includes a call stack having one or more call stack positions. The user of the monitored extension can configure the shared extension, in particular, portions of the call stack to be shared with a proxy extension. The proxy extension can then perform call functions on calls queued in a call stack position that is shared with the proxy extension. For example, the monitored extension is an extension for a boss in a business environment, and the proxy extension is an extension for the boss' secretary. If a call is queued in a call stack position shared with the secretary's extension, then the secretary can perform call functions on the call such as: answering calls in the shared portion of the call stack; sending calls in the shared portion of the call stack to voicemail; moving calls from a private portion of the stack to a shared portion of the stack; building conference calls by connecting calls on the shared call stack to a conference call on a monitored and/or proxy extension; transferring calls for the monitored or proxy extensions to the shared call stack; transferring calls between different extensions or external numbers; redirecting calls to different extensions or external numbers; make and take calls for different stack positions on the shared call stack at the same time; the call history of the monitored extension is shared with the proxy extension and the secretary can view the call history of the boss; and the proxy extension can change the call handling mode of the boss extension.

The shared extension is implemented by a monitoring device 132 such as a switch or server. The monitoring device 132 monitors the monitored extension. The monitoring device 132 detects an incoming call to the monitored extension and redirects the call to the shared extension. The monitoring device 132 makes the incoming call available as a call option for the monitored extension and the proxy extension so that the monitored extension and the proxy extension can perform call functions on the incoming call.

Further features of the invention, its nature, and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

FIG. 10 illustrates a screen shot of a graphical user interface for setting up a monitored bridged call appearance according to one embodiment of the present invention.

DETAILED DESCRIPTION OF THE EMBODIMENTS

The present invention is now described more fully with reference to the accompanying figures, in which several embodiments of the invention are shown. The present invention can be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. Overview of a Shared Call Stack

Figure 1A:
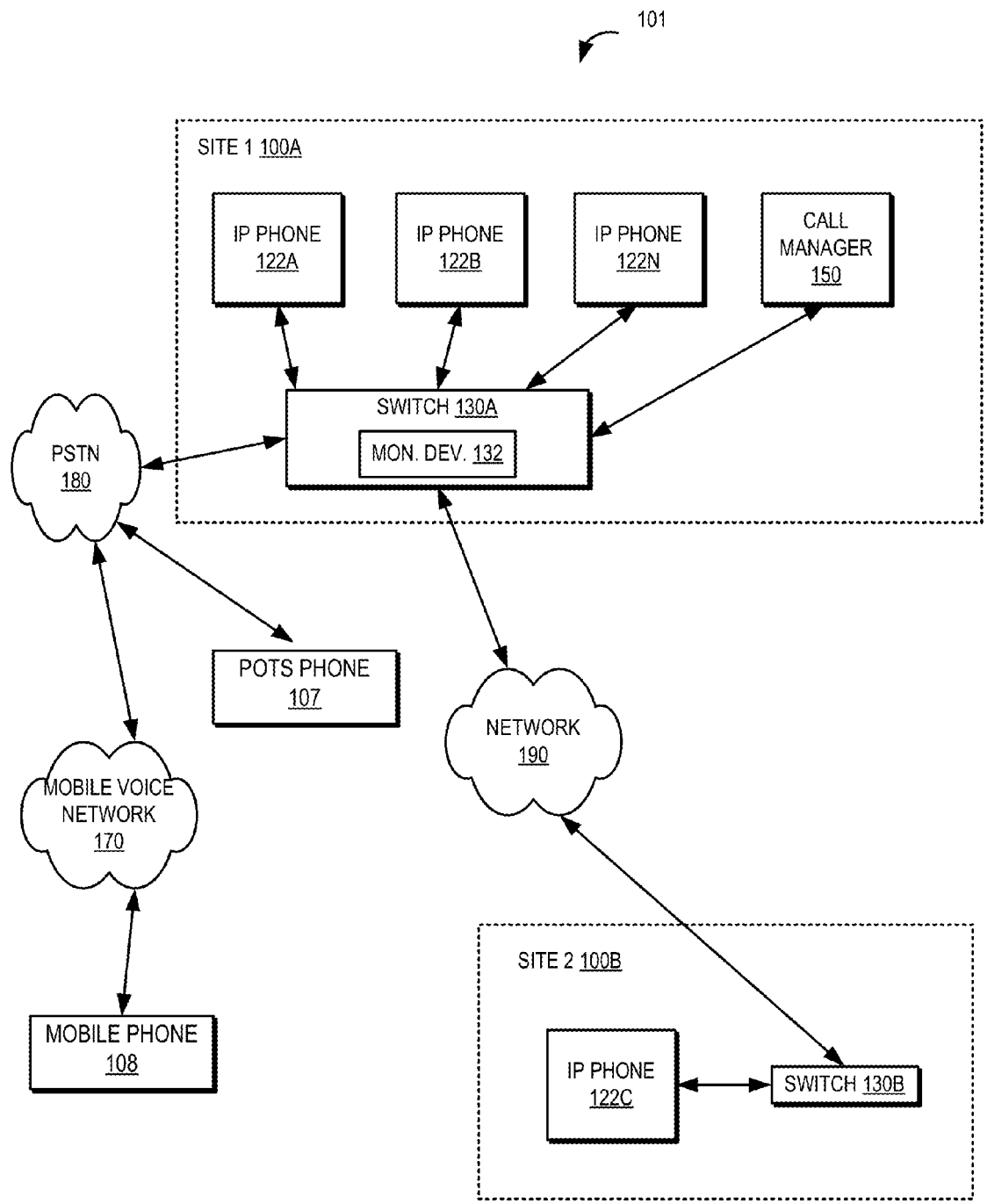
FIG. 1A illustrates a block diagram of a distributed telephony system architecture, according to one embodiment of the present invention, in which a switch is a monitoring device 132.
Figure 1B:
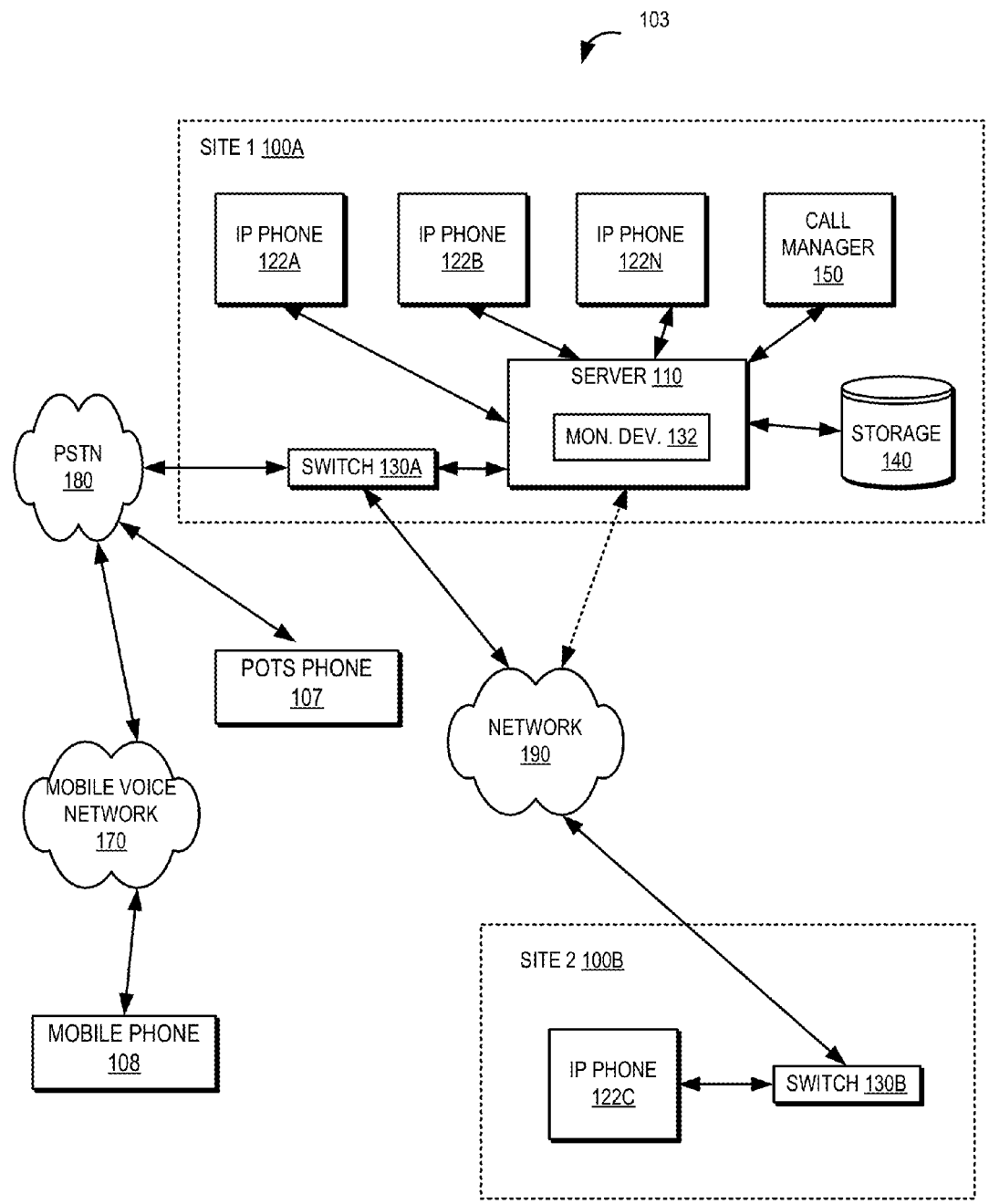
FIG. 1B illustrates a block diagram of a distributed telephony system architecture, according to one embodiment of the present invention, in which a server is a monitoring device 132.
Figure 2A:
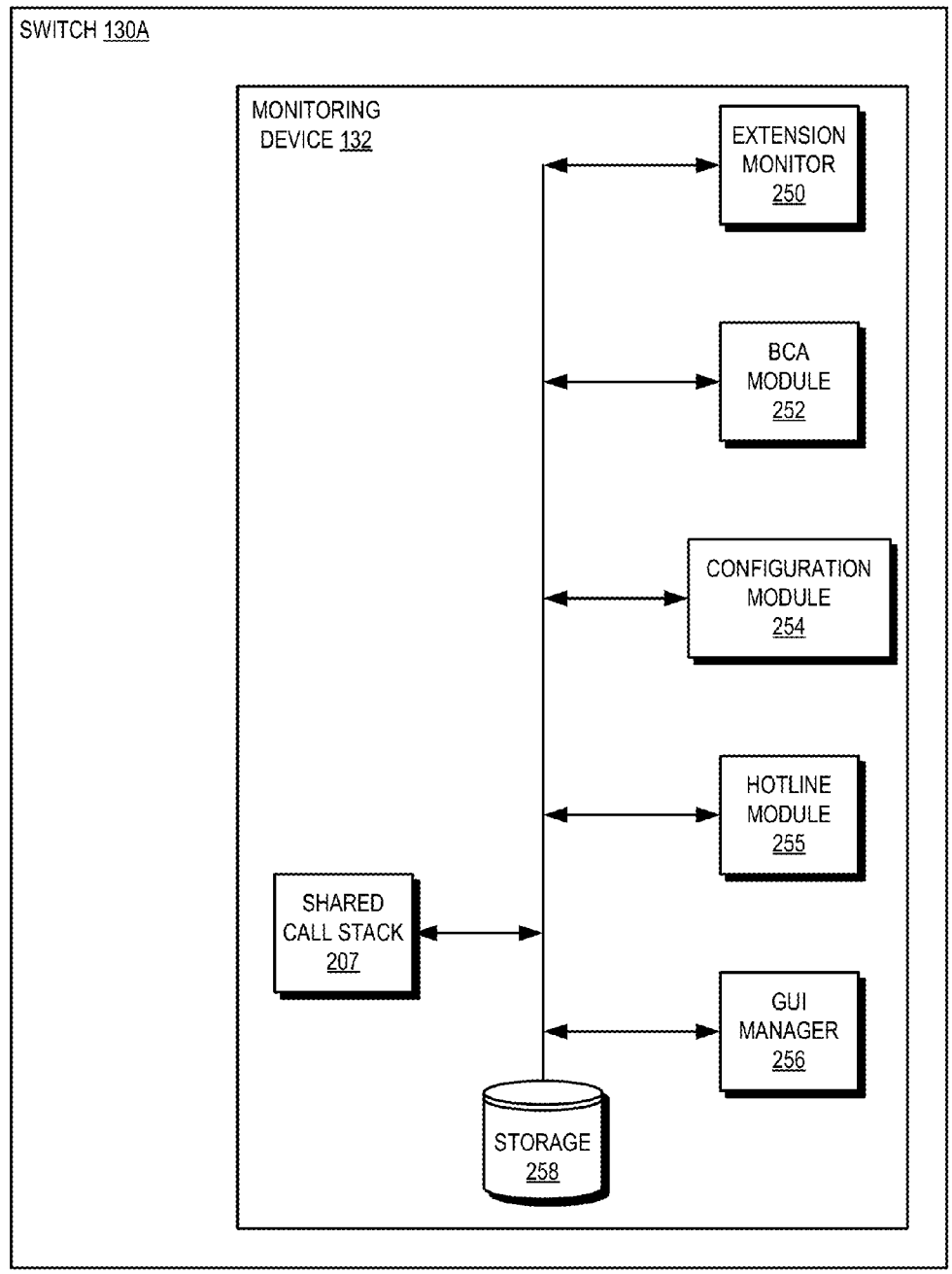
FIG. 2A illustrates a block diagram of switch, according to one embodiment of the present invention.
Figure 2B:
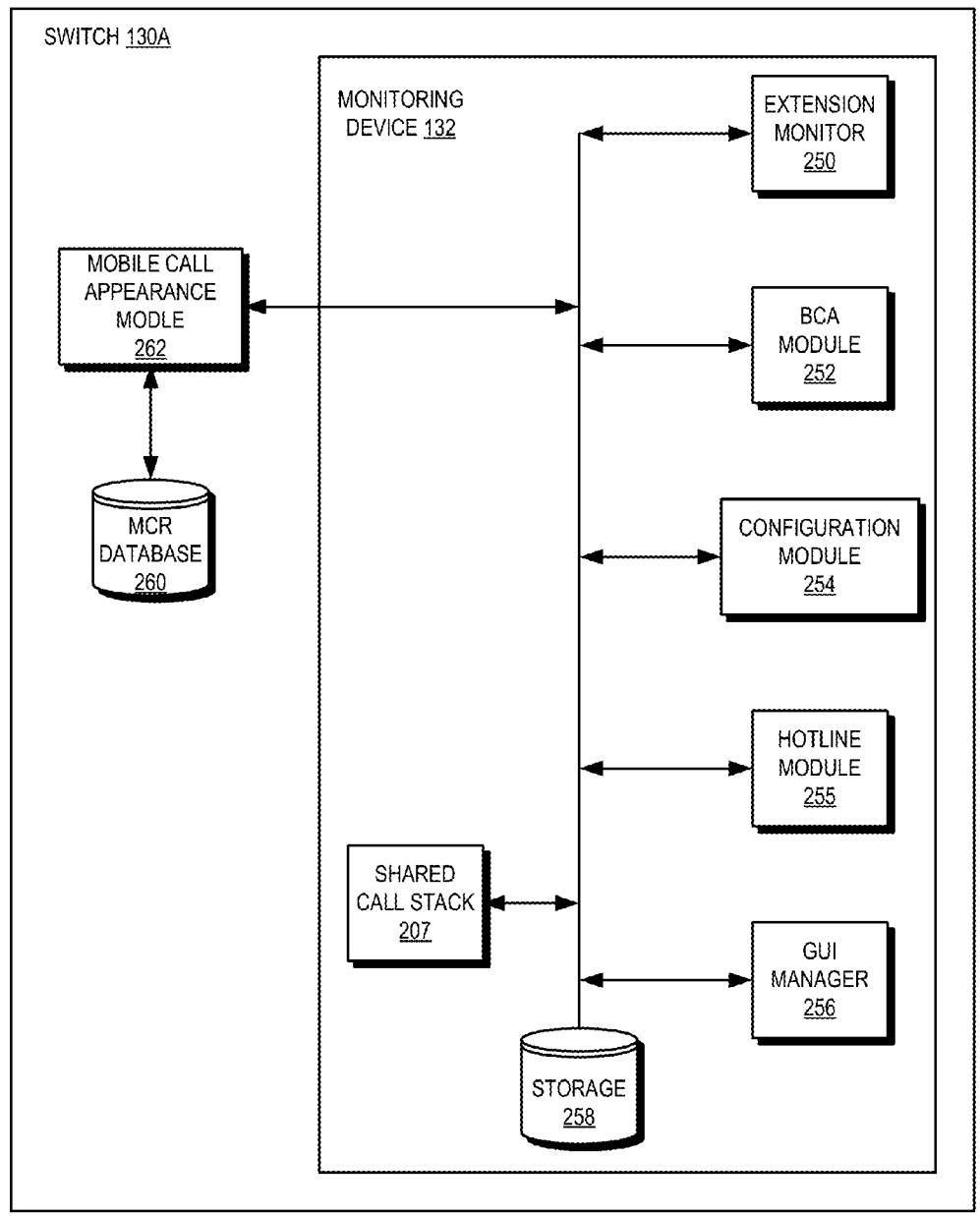
FIG. 2B illustrates a block diagram of a switch adapted to include functionality for a mobile call appearance according to one embodiment of the present invention.
Figure 2C:
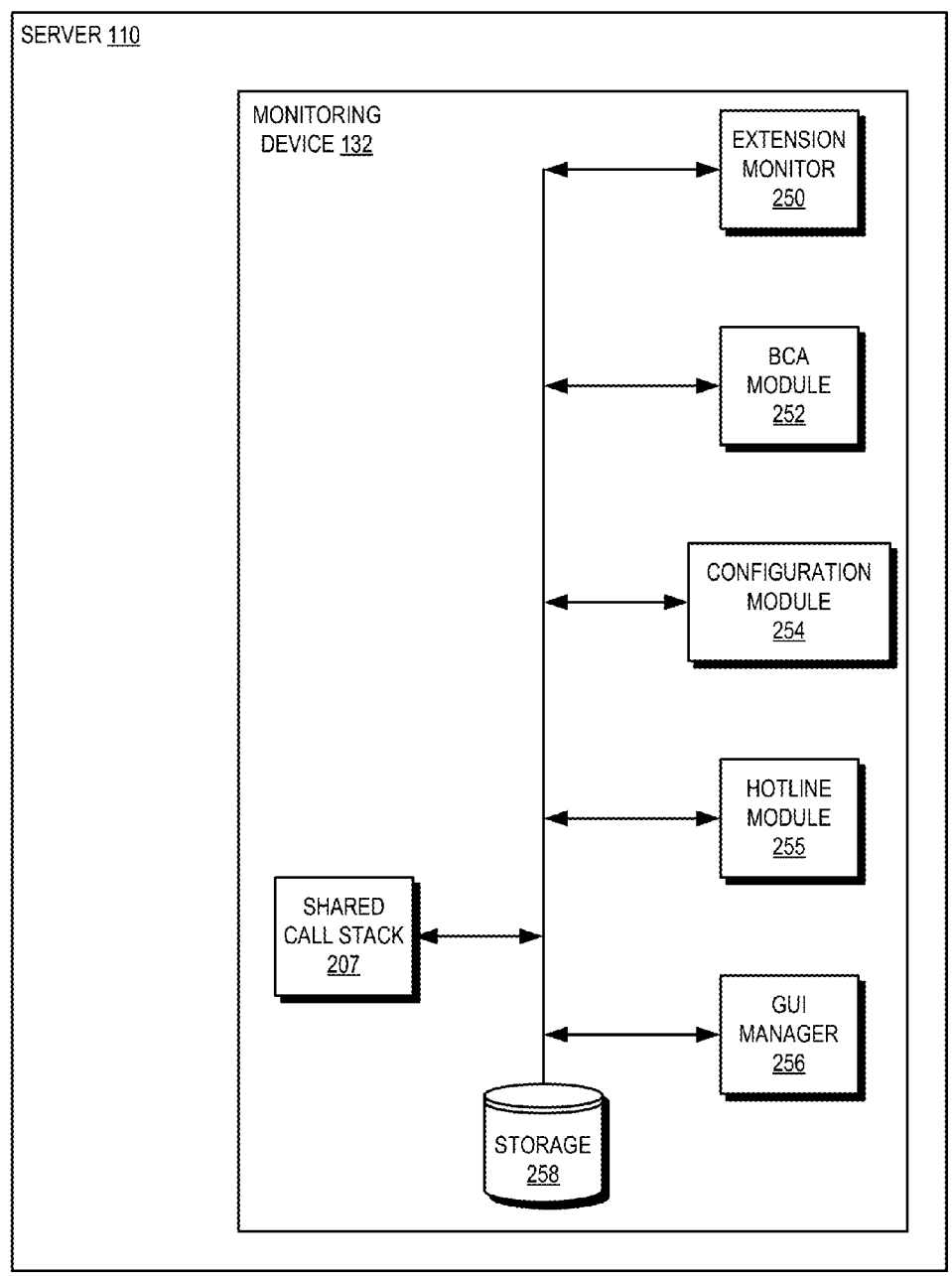
FIG. 2C illustrates a block diagram of a server according to one embodiment of the present invention.
Figure 2D:
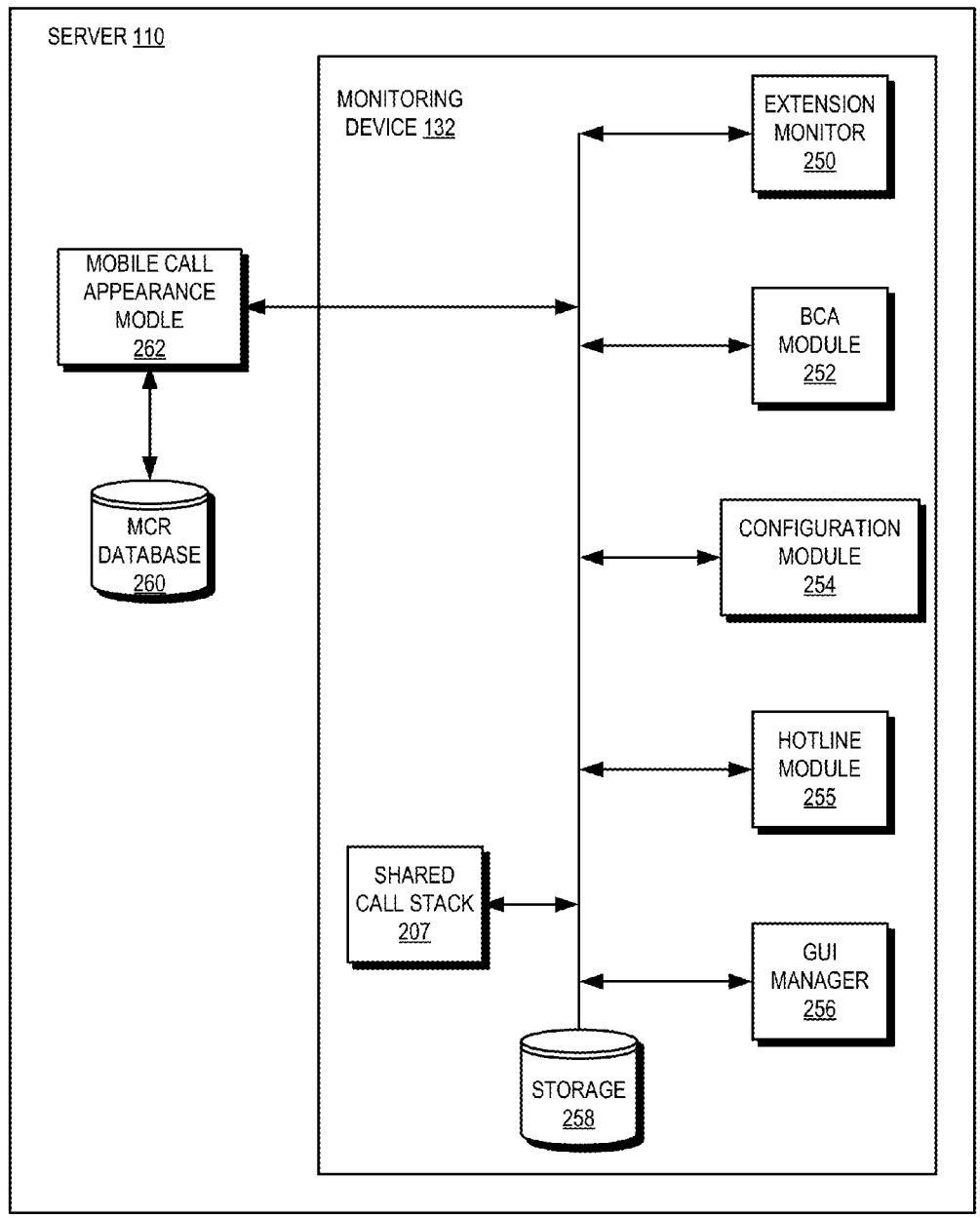
FIG. 2D illustrates a block diagram of a server adapted to include functionality for a mobile call appearance according to one embodiment of the present invention.

A monitoring device 132 enables a first user having a first extension to monitor a second extension that is not the first user's extension by presenting the first user with a bridged call appearance of the second extension. The first extension is referred to herein as a "proxy extension," a "secretary extension" or a "monitoring extension," and the second extension is referred to as a "monitored extension" or a "boss extension." In various embodiments, the monitored extension and the proxy extension are associated with devices such as IP phones, mobile phones or softphones. The monitoring device 132 is, for example, a switch or a server computer coupled to the various endpoints. The monitoring device 132 is configured (for example, regarding which extensions it should monitor) by using the device itself or by using a software application that runs on a monitoring device 132 having a memory for storing the software application and one or more processors for executing the software application or a general purpose computer. FIGS. 1A, 2A and 2B illustrate embodiments where the monitoring device 132 is a switch. FIGS. 1B, 2C and 2D illustrate embodiments where the monitoring device 132 is a server computer.

In one embodiment, the monitoring device 132 provides functionality for enabling a user acting as a proxy to perform a call function on calls directed to a monitored extension, such as: answering calls in the shared portion of the call stack; sending calls in the shared portion of the call stack to voicemail; moving calls from a private portion of the stack to a shared portion of the stack; building conference calls by connecting calls on the a shared call stack to a conference call on a monitored and/or proxy extension; transferring calls for the monitored or proxy extensions to the shared call stack; transferring calls between different extensions or external numbers; redirecting calls to different extensions or external numbers; make and take calls for different stack positions on the shared call stack at the same time; the call history of the monitored extension is shared with the proxy extension and the secretary can view the call history of the boss; and the proxy extension can change the call handling mode of the boss extension.

A call handling mode is a user setting for a device associated with a monitored extension or a proxy extension that defines how the device will respond to receiving an incoming call. For example, the default call handling mode defines that an incoming call for an extension causes a device associated with that extension to ring, or otherwise indicate that there is an incoming call. However, the call handling mode can be changed so that the incoming call is, for example: redirected to voicemail; redirected to a different extension; or redirected to a different phone line. A person having ordinary skill in the art will recognize that other call handling modes are possible.

A proxy extension can provide an input to a device associated with the proxy extension, and, responsive to this input, the monitoring device 132 will change the call handling mode of a monitored extension associated with the proxy extension. For example, a boss is out of of office and a secretary notices that the boss' phone is ringing, thereby indicating that the call handling mode for the boss' extension is in the default mode. The secretary can enter an input in the device associated with the secretary's extension. The monitoring device 132 receives this input, and responsive to this input changes the call handling mode of the boss' extension so that all incoming call are redirected to the secretary's extension.

The monitoring device 132 provides functionality for enabling a monitoring extension to monitor one or more extensions. In addition, a monitored extension can be monitored by one or more proxy extensions.

A shared call stack is stored on the monitoring device 132. In general, the shared call stack is implemented as follows: An extension (the "monitored extension") is associated with a bridged call appearance extension (the "BCA extension" or the "shared extension"). A monitoring device 132 monitors the monitored extension. The monitoring device 132 sends information about the monitored extension to the BCA extension. The monitoring device 132 also enables the BCA extension to provide information about the monitored extension to a third extension (the "proxy extension"), and enables a user of the third extension to modify information on the BCA extension that is associated with monitored extension. Modifying this information also modifies information on the monitored extension. For example, the monitored extension is an extension for a boss in a business and the proxy extension is an extension for a secretary. Since the monitored extension is the boss' extension, the BCA extension is referred to as the Boss Bridged Call Appearance extension (the "bBCA extension"). The monitoring device 132 detects an incoming call for the boss' extension. The monitoring device 132 redirects the incoming call to the bBCA extension. The monitoring device 132 makes the incoming call available as a call option on the bBCA extension. Calls for the boss are arranged in the shared call stack on the bBCA extension. The call stack, or a portion of the call stack, is shared with the secretary. The monitoring device 132 sends information to the boss' extension and the secretary's extension causing devices associated with these extensions, such as IP phones or softphones, to display a bridged call appearance of the call stack to both the boss' extension and the secretary's extension. The secretary interacts with a device associated with the secretary's extension (e.g., an IP phone, mobile phone or softphone) by pressing buttons or a touch sensitive display. In one embodiment the secretary is using a softphone and interfaces with the bBCA extension using software stored on and executed by a processor-based computing device. For example, the secretary interfaces with a call manager program stored on and executed by a personal computer. A signal is transmitted to the monitoring device 132 responsive to secretary's input indicating that the secretary desires to modify the boss' extension or a call in the shared call stack. These modifications can include, for example, answering the call, transferring the call, placing the call on hold, or sending the call to voicemail. The monitoring device 132 modifies the call in the call stack in a manner consistent with the secretary's input.

In one embodiment, the monitoring device 132 also provides a dedicated hotline between the monitored extension and the proxy extension that allows users of either extension to contact the other extension. For example, a button on the secretary's phone is configured with the monitoring device 132 to establish a hotline call between the secretary and the boss. The secretary observes from the monitored bridged call appearance that the boss has a number of calls parked on the bBCA extension. The secretary presses the hotline button, thereby causing the monitoring device 132 to receive input indicating that the secretary desires to establish a hotline call between the boss extension and the secretary extension. The monitoring device 132 connects a hotline call between the boss' extension and the secretary's extension. The secretary can now receive instructions from the boss regarding how to manage the calls parked on the bBCA extension.

B. System Overview

FIG. 1A illustrates a block diagram of a distributed IP telephony network system 101, according to a first embodiment of the present invention. In the illustrated embodiment, the switch 130A comprises, among other things, a monitoring device 132 that implements features or functions of the present invention. The switch 130A is coupled to the PSTN 180, the network 190, the call manager 150 and the IP phones 122A, 122B, 122N. The switch 130A is discussed in further detail below with reference to FIGS. 2A and 2B.

The illustrated first embodiment, the system 101 includes a first site 100A and a second site 100B. As used herein, a site represents a grouping of resources. In the illustrated embodiment, the two sites 100A, 100B are communicatively coupled via a network 190. One skilled in the art will note that sites 100A, 100B can be physically distinct from each other or merely topology-related groupings that are not in physically distinct locations. The system 101 in FIG. 1A is used only by way of example. While FIG. 1A illustrates two sites 100A, 100B, the present invention applies to any system architecture containing any number of sites.

In one embodiment, the first site 100A includes a switch 130A, three endpoints (IP phones 122A, 122B and 122N), and a computing device running a call manager software application 150. The switch 130A represents a Voice over Internet Protocol (VoIP) device to which a number of endpoints can be coupled, such as IP phones 122A, 122B, 122N. (Here, "N" indicates that there can be any number of IP phones 122.) In one embodiment, the endpoints coupled to the switch 130A include one or more analog phones and/or software phones/softphones (not pictured). In the illustrated embodiment, the switch 130A is coupled to the network 190. The switch 130A is also coupled to the public switched telephone network (PSTN) 180 via an analog or digital trunk line (e.g., a T1 or E1 interface). In the illustrated configuration, the switch 130A provides an interface for calls originating from or terminating on the PSTN 180 or the network 190. The PSTN 180 is coupled to a plain old telephone phone service phone (POTS phone) 107, and a mobile voice network 170 coupled to any number of mobile phones represented by mobile phone 108. Thus, POTS phone 107 calls and mobile phone 108 calls can originate on the switch 130A via the PSTN 180.

An endpoint enables a user to carry on a phone call. Although in the illustrated embodiment the first site 100A has three illustrated endpoints (IP phones 122A, 122B, 122N), in other embodiments the first site 100A has different numbers and types of endpoints. An endpoint is coupled to a switch 130, a server computer 110, or both.

An endpoint has a user interface to send data to and receive data from a user. The IP phone 122A, 122B, 122N has, for example, both a Telephone User Interface (TUI) and a Graphical User Interface (GUI) that sends data through a display device associated with the IP phone 122A, 122B, 122N. In one embodiment, the IP phone's graphical user interface also receives data from a touchscreen display device associated with the IP phone 122A, 122B, 122N. The touchscreen display device is used, for example, to provide input to a monitoring device 132 (e.g., switch 130A or a server) regarding choices made by a user of the IP phone 122A, 122B, 122N. In one embodiment, the IP phone 122A, 122B, 122N has buttons that are programmed to provide input to the monitoring device 132.

A computing device running a call manager software application 150, such as a computer, controls one or more endpoints with which it is associated. In one embodiment, call manager 150 offers a user an interface through which the user can perform call-related functions.

In one embodiment, the call manager 150 comprised within an endpoint such as IP phone 122A and/or mobile phone 108. For example, the IP phone 122A is a device that includes a processor and a memory. The call manager software application 150 is stored in the memory and executed by the processor. Thus, an endpoint can comprise and execute a call manager 150. A person having ordinary skill in the art will understand that in one embodiment one or more of IP phones 122A, 122B and 122N (and/or one or more mobile phones 108) comprise and execute different call managers 150.

Although in the illustrated embodiment the first site 100A has one call manager 150, in other embodiments the first site 100A has a different number of call managers 150. Also, more than one call manager 150 can control the same endpoint. The association between a call manager 150 and an endpoint that it controls is accessed through the switch 130A.

One skilled in the art will appreciate that additional networking devices (not shown) can be added to the first site 100A, for example, if needed to support additional endpoints. Such additional networking devices include additional switches 130 or one or more server computers. For example, the first site 100A can include any number of switches 130A and an edge router to couple the first site 100A to the network 190 and to provide local area connectivity for the switches 130A. One skilled in the art will also recognize that numerous configurations of switches 130A and communications links are contemplated. For example, PSTN links can be coupled to multiple switches 130A at several points within the topology and softswitches 130A can also be used.

The second site 100B similarly includes an endpoint (e.g., IP phone 122C) and a switch 130B. In one embodiment, the switch 130B of the second site 100B can be managed by the switch 130A that is illustrated in the first site 100A. A call can involve more than one switch. For example, a call that originates from the PSTN 180 and terminates on an endpoint that is communicatively coupled to switch 130B of the second site 100B involves two switches: switch 130A of the first site 100A and switch 130B of the second site 100B.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wireline or wireless (i.e., terrestrial- or satellite-based transceivers). In one embodiment of the present invention, the network 190 is an IP-based wide or metropolitan area network.

Turning now to FIG. 1B, depicted is a block diagram of a distributed telephony network system 103, according to a second embodiment of the present invention. In the illustrated embodiment, the server computer 110 comprises, among other things, the monitoring device 132 that implements features or functions of the present invention. The server 100 is discussed in further detail with references to FIGS. 2C and 2D.

The second embodiment includes similar components to the first embodiment described above with reference to FIG. 1A, so that description will not be repeated here. Like reference numerals have been used for like components with similar functionality. However, this embodiment adds a server computer 110 and a storage device 140. Here, the monitoring device 132 is implemented in the server computer 110 instead of the switch 130A. The switch 130A is a conventional switch used in VoIP systems. The server computer 110 is coupled to the network 190, the switch 130A and one or more endpoints, such as IP phones 122A, 122B, 122N or a softphone (not pictured). The functionality of the server computer 110 is described in further detail with reference to FIGS. 2C and 2D. The storage device 140 stores extension monitoring information, including associations between monitored extension(s), the BCA extension and the proxy extension(s). In one embodiment, the storage device 140 also stores GUI information that provides a bridged call appearance of the BCA extension to any number of monitored extensions and any number of proxy extensions. In the illustrated embodiment, the storage device 140 is directly coupled to the server computer 110. In an alternate embodiment, the storage device 140 is coupled to the server computer 110 via the network 190.

Figure 1C:
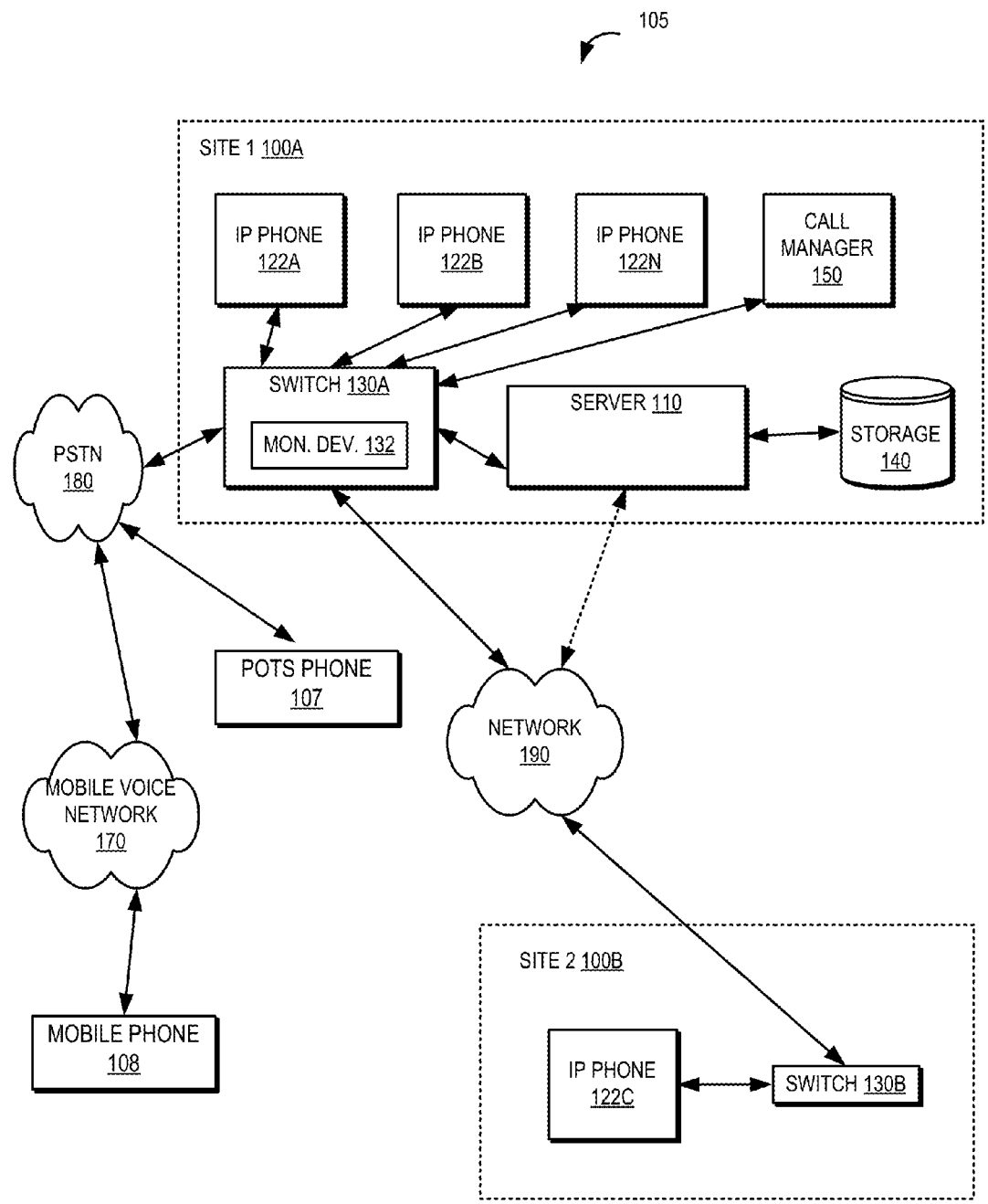
FIG. 1C illustrates a block diagram of a distributed telephony system architecture, according to one embodiment of the present invention, in which a switch is a monitoring device 132.

Turning now to FIG. 1C, depicted is a block diagram of a distributed telephony network system 105, according to a third embodiment of the present invention. The third embodiment includes similar components to the first embodiment described above with reference to FIG. 1A, so that description will not be repeated here. Like reference numerals have been used for like components with similar functionality. However, in this embodiment the monitoring device 132 is comprised within the switch 130A instead of the server 110.

In one embodiment, the storage device 140 is comprised within the switch 130A and the switch stores data used to implement features or functions of the present invention. For example, the switch 130A of FIGS. 1A, 1B and 1C includes a storage device 140 that is a non-transitory computer-readable memory (e.g., a hard drive, RAM or flash memory) that stores information such as the GUI information discussed above. A person having ordinary skill in the art will appreciate that the monitoring device 132 is communicatively coupled to the storage device 140 so that the monitoring device 132 can access data and information stored on the storage device 140, and that the storage device 140 can store data and information in addition to the GUI information.

In one embodiment the IP phones 122A, 122B, 122N and the call manager 150 are communicatively coupled to the PSTN 180 and/or the network 190 so that the IP phones 122A, 122B, 122N can send and receive signals, data and/or information using the PSTN 180 and/or network 190.

In FIGS. 1B and 1C the server 110 is depicted as coupled to the network by a dashed signal line. The dashed signal line indicates that this coupling is optional, and not a required feature of the embodiments depicted in FIG. 1B or 1C. For example, a person having ordinary skill in the art will recognize that the server 110 is communicatively coupled to the switch 130A, that switch is in turn communicatively coupled to the network 190, and that in one embodiment the server 110 can access the network 190 via the switch 130A.

C. Monitoring Device Overview

FIG. 2A illustrates a block diagram of switch, according to one embodiment of the present invention. In this embodiment, the switch 130A is an apparatus configured to implement features or functions of the present invention. The switch 130A includes: a monitoring device 132; an extension monitor module 250; a bridged call appearance module (the "BCA module") 252; a configuration module 254; a hotline module 255; a graphical user interface module (the "GUI module") 256; one or more shared call stacks 207; and a storage device 258.

The monitoring device 132 is an apparatus configured to provide a shared call stack to a monitored extension and one or more proxy extensions. The features and functionality of the monitoring device 132 is discussed in further detail with reference to FIGS. 2A-2D, 3A-3C, 4A-4D, 5A-5C, 6A, 6B, 7, 8A, 8B, 9 and 10.

The extension monitor module 250 is an apparatus configured to monitor any number of monitored extensions. For example, the extension monitor module 250 monitors calls incoming to a monitored extension, and calls originating from the monitored extension. The extension monitor module 250 is communicatively coupled to the BCA module 252. Upon detecting activity associated with the monitored extension, the extension monitor module 250 signals that BCA module 252 that such activity is occurring. In one embodiment, the extension monitor module 250 redirects the incoming call for the monitored extension to the monitoring device 132 to be handled by the BCA extension. The BCA extension is an extension associated with the monitoring device 132 and is used to implement features and functionality of the one or more shared call stacks 207. In one embodiment, the extension monitor module 250 is one or more electronic devices configured to provide the functionality of the extension monitor module 250. In another embodiment, the extension monitor module 250 is code and routines stored in a non-transitory computer-readable medium that, when executed by a processor, provides the functionality described above for the extension monitor module 250.

The BCA module 252 is an apparatus configured to manage the one or more call stacks 207 for the BCA extension. For example, the BCA module 252 receives an incoming call redirected from the monitored extension and makes the incoming call available as a call option for the monitored extension and the proxy extension so that the monitored extension and the proxy extension can perform a call function on the incoming call. In one embodiment, the BCA module 252 makes the incoming call available as a call option by adding the incoming call to a position in the call stack.

The BCA module 252 also receives inputs and performs call functions on calls responsive to these inputs. Examples of such call functions include: answering calls in the shared portion of the call stack; sending calls in the shared portion of the call stack to voicemail; moving calls from a private portion of the stack to a shared portion of the stack; building conference calls by connecting calls on the shared call stack to a conference call on a monitored and/or proxy extension; transferring calls for the monitored or proxy extensions to the shared call stack; transferring calls between different extensions or external numbers; redirecting calls to different extensions or external numbers; make and take calls for different stack positions on the shared call stack at the same time; the call history of the monitored extension is shared with the proxy extension and the secretary can view the call history of the boss; and the proxy extension can change the call handling mode of the boss extension.

The BCA module 252 also provides functionality to enable the proxy extension to make "proxy calls" on behalf of the monitored extension. For example, a secretary provides input to a device associated with the secretary's extension indicating that a "proxy call" is desired. For example, the device associated with the secretary's extension is an IP phone such as IP phone 122. The IP phone 122 receives the input from the secretary and, responsive to this input, the IP phone 122 sends a signal to the monitoring device 132. The BCA module 252 receives this input. The secretary then makes a call from the secretary extension. For example, the secretary enters one more inputs into the IP phone 122 indicating that the secretary desires to make a phone call. The IP phone 122 receives the input from the secretary and, responsive to the input, the IP phone 122 sends a call request signal to the monitoring device 132. The BCA module 252 receives the call request signal, generates a call request, attaches an identifier for the boss' extension to the call request and makes the call using the BCA extension. The identifier is stored, for example, in the storage device 258. The BCA module 252 transfers the call request with the attached identifier to one of the networks 170, 180, 190 coupled to the switch 130A. When the called party receives the call, the caller identifier (i.e., caller ID) indicates that the call is from boss' extension, and not from the secretary's extension. The connected call is then parked on the BCA extension until either the boss or the secretary provide input indicating that the call should be unparked and connected to a device associated with either the boss' extension or the secretary's extension.

In one embodiment, the BCA module 252 provides features and functionality that enable associated users (e.g., bosses and secretaries) to manipulate each other's calls and device configurations. For example, the BCA module 252 receives inputs from an IP phone associated with a secretary's extension and, responsive to these inputs, moves calls for the boss's extension into and out of the shared portion of the call stack. These calls can be moved to the boss' extension, the secretaries' extension or some other extension. The BCA module 252 also enables associated users to reconfigure devices associated with each other's extensions. For example, the secretary can use the IP phone associated with the secretary's extension to reconfigure the settings for the device associated with the boss' extension.

The above description describes the BCA module 252 as an apparatus. In one embodiment, the BCA module 252 is one or more electronic devices configured to provide the functionality of the BCA module 252. In another embodiment the BCA module 252 is code and routines stored in a non-transitory computer-readable medium that, when executed by a processor, provides the functionality described above for the BCA module 252.

The configuration module 254 is an apparatus adapted to allocate call stack positions in the one or more call stacks 207. The configuration module 254 is communicatively coupled to the BCA module 252 and the one or more call stacks 207. In one embodiment, the configuration module 254 allocates the call stack positions based on input received from a device associated with either the switch 130A, or a device associated with either the monitored extension or the proxy extension. For example, the configuration module 254 receives inputs from user devices, such as an IP phone associated with the monitored extension or proxy extension, indicating that portions of the call stack 207 should be private, semi-private or public. The configuration module 254 then allocates the call stack 207 associated with the BCA extension according to the input. For example, the configuration module 254 receives input indicating that portions of the call stack 207 should be made private to a boss' extension, and that remaining portions of the call stack 207 should be shared with a secretary's extension. The configuration module 254 then allocates the call stack 207 accordingly. This functionality will be discussed in more detail with reference to FIGS. 6A and 6B.

In one embodiment, the configuration module 254 is one or more electronic devices configured to provide the functionality of the configuration module 254. In another embodiment, the configuration module 254 is code and routines stored in a non-transitory computer-readable medium that, when executed by a processor, provides the functionality described above for the extension monitor module 250.

The hotline module 255 is an apparatus configured to create, use and terminate a committed, bidirectional hotline between two associated users. For example, the secretary and the boss each have an IP phone with a button dedicated to a hotline extension. The button is configured so that pressing the button sends an input to the hotline module 255. Upon receipt of this input, the hotline module 255 connects a hotline call between the boss' extension and the secretary's extension.

In one embodiment, the hotline module 255 is one or more electronic devices configured to provide the functionality of the hotline module 255. In another embodiment, the hotline module 255 is code and routines stored in a non-transitory computer-readable medium that, when executed by a processor, provides the functionality described above for the hotline module 255.

The GUI manager module 256 is an apparatus configured to provide user devices with data necessary for displaying different graphical user interfaces (GUIs). The data for the GUIs is stored on the storage device 258. The GUI manager module 256 receives a signal indicating that a certain GUI is to be displayed on a particular user device. The GUI manager module 256 queries the storage device 258 and retrieves the data necessary for the GUI. The GUI manager module 256 then signals the user device and provides data causing the device to display the required GUI. For example, the GUI manager module 256 receives a signal from the BCA module 252 indicating that a new call has been parked on the BCA extension, and that the GUIs for the IP phones associated with both the boss extension and the secretary extension need to be updated to reflect this change in the call stack. The GUI manager module 256 retrieves data for a new GUI from the storage device 258, and delivers this data to both IP phones, thereby causing their respective GUIs to change and reflect the updated call stack.

In one embodiment, the GUI manager module 256 is adapted to create and provide GUIs related to the features and functionality of the monitoring device 132 for all devices having graphic displays and communicatively coupled to the switch 130A, whether directly or indirectly, such as IP phone 122A, IP phone 122C and/or mobile phone 108. For example, the IP phone 122C depicted in FIG. 1A is communicatively coupled to the switch 130B. If the IP phone 122C request a call function related to the features and functionality of the monitoring device 132, the monitoring device 132 provides the requested call function and the GUI manager module 256 creates and provides a GUI for display on IP phone 122C that is appropriate to the requested call function. Thus, in this embodiment the GUI manager module 256 creates and provides GUIs for a device that is at a site different from the site where the monitoring device 132 is located.

In one embodiment, the GUI manager module 256 is one or more electronic devices configured to provide the functionality of the GUI manager module 256. In another embodiment the GUI manager module 256 is code and routines stored in a non-transitory computer-readable medium that, when executed by a processor, provides the functionality described above for the GUI manager module 256.

The storage device 258 is a non-transitory computer-readable medium that stores information for the extension monitor module 250, BCA module 252, configuration module 254, hotline module 255, the GUI manager module 256 and the one or more call stacks 207. For example, the storage device 258 stores: data describing which monitored extensions and proxy extensions are associated with one another; one or more call stacks 207 for a BCA extension; the various associations for the BCA extension; how call stack positions for the BCA extension's call stack 207 are allocated; permissions for access granted to proxies; a description of which calls are made available as call options on the call stack 207; associations describing which extensions have hotlines between them; and the GUI data used by the GUI manager module 256. In another embodiment, the storage module 258 stores different and/or additional information. The storage module 258 is communicatively coupled to the extension monitor module 250, BCA module 252, configuration module 254, hotline module 255, the one or more call stacks 207 and the GUI manager module 256.

In another embodiment, the switch 130A includes a processor (such as a general-purpose microprocessor) and a memory (such as a non-transitory computer-readable hard drive, RAM or flash memory) storing computer-code modules that are executed by the processor to provide the functionality described above for the monitoring device 132.

Turning now to FIG. 2B, depicted is a block diagram of a switch 130A adapted to include functionality for providing a mobile call appearance of the call stack 207 to mobile phones such as mobile phone 108, according to one embodiment of the present invention. This embodiment includes similar components to the embodiment described above with reference to FIG. 2A so that description will not be repeated here. Like reference numerals have been used for like components with similar functionality. However, this embodiment adds a mobile call appearance module 262 and a mobile call resource database (the "MCR database") 260 as part of the switch 130A.

The mobile call appearance module 262 is an apparatus configured to interface with a mobile phone device such as mobile phone 108 (see FIGS. 1A, 1B) to provide access to the functionality of the extension monitor module 250, BCA module 252, configuration module 254, hotline module 255, the GUI manager module 256, call stack 20 and storage device 258 to the mobile phone 108. The mobile phone 108 can be either a monitored extension or a proxy extension. In one embodiment, the mobile phone 108 is adapted to have programmable buttons that are configured to provide inputs to the monitoring device 132 (e.g., switch 130A or server computer 110) necessary to provide the functionality of the above-described modules 250-256, call stack 207 and storage device 258.

In one embodiment, the mobile call appearance module 262 is one or more electronic devices configured to provide the functionality of the mobile call appearance module 262. In another embodiment, the mobile call appearance module 262 is code or routines stored in a non-transitory computer-readable medium that, when executed by a processor, provides the functionality described above for the mobile call appearance module 262.

The mobile call appearance module 262 is communicatively coupled to a mobile call resource database (the "MCR database") 260. The MCR database 260 is a non-transitory computer-readable storage medium that stores information describing how to route bridged call appearances to the mobile phone 108. For example, the mobile phone 108 is configured as the monitored extension, and a change is made to the call stack 207. The mobile call appearance module 262 receives information from the BCA module 252 or the configuration module 254 indicating this change, as well as information from the GUI manager module 256 for a new GUI to be displayed on the mobile phone 108 to indicate this change. The mobile call appearance module 262 queries the MCR database 260 to determine how to route this information to the mobile phone 108. The mobile call appearance module 262 receives the routing information from the MCR database 260 and communicates the updated call stack to the mobile phone 108. The mobile phone 108 displays a GUI depicting the new call stack.

Turning now to FIG. 2C, depicted is a block diagram of a server computer 110 according to one embodiment of the present invention. This embodiment includes similar components to the embodiment described above for FIG. 2A so that description will not be repeated here. Like reference numerals have been used for like components with similar functionality. However, in this embodiment the monitoring device 132 is part of or operates within the server computer 110 instead of the switch 130A. In another embodiment, the server computer 110 includes a processor (such as a general-purpose microprocessor) and memory (such as a non-transitory computer-readable hard drive or RAM) storing computer-code modules that are executed by the processor.

Turning now to FIG. 2D, depicted is a block diagram of a server computer 110 according to one embodiment of the present invention. This embodiment includes similar components to the embodiment described above for FIG. 2B so that description will not be repeated here. Like reference numerals have been used for like components with similar functionality. However, in this embodiment the monitoring device 132 is part of or within the server computer 110 instead of the switch 130A. In another embodiment, the server computer 110 includes a processor (such as a general-purpose microprocessor) and memory (such as a non-transitory computer-readable hard drive or RAM) storing computer-code modules that are executed by the processor.

D. Boss Bridged Call Appearance

Figure 3A:
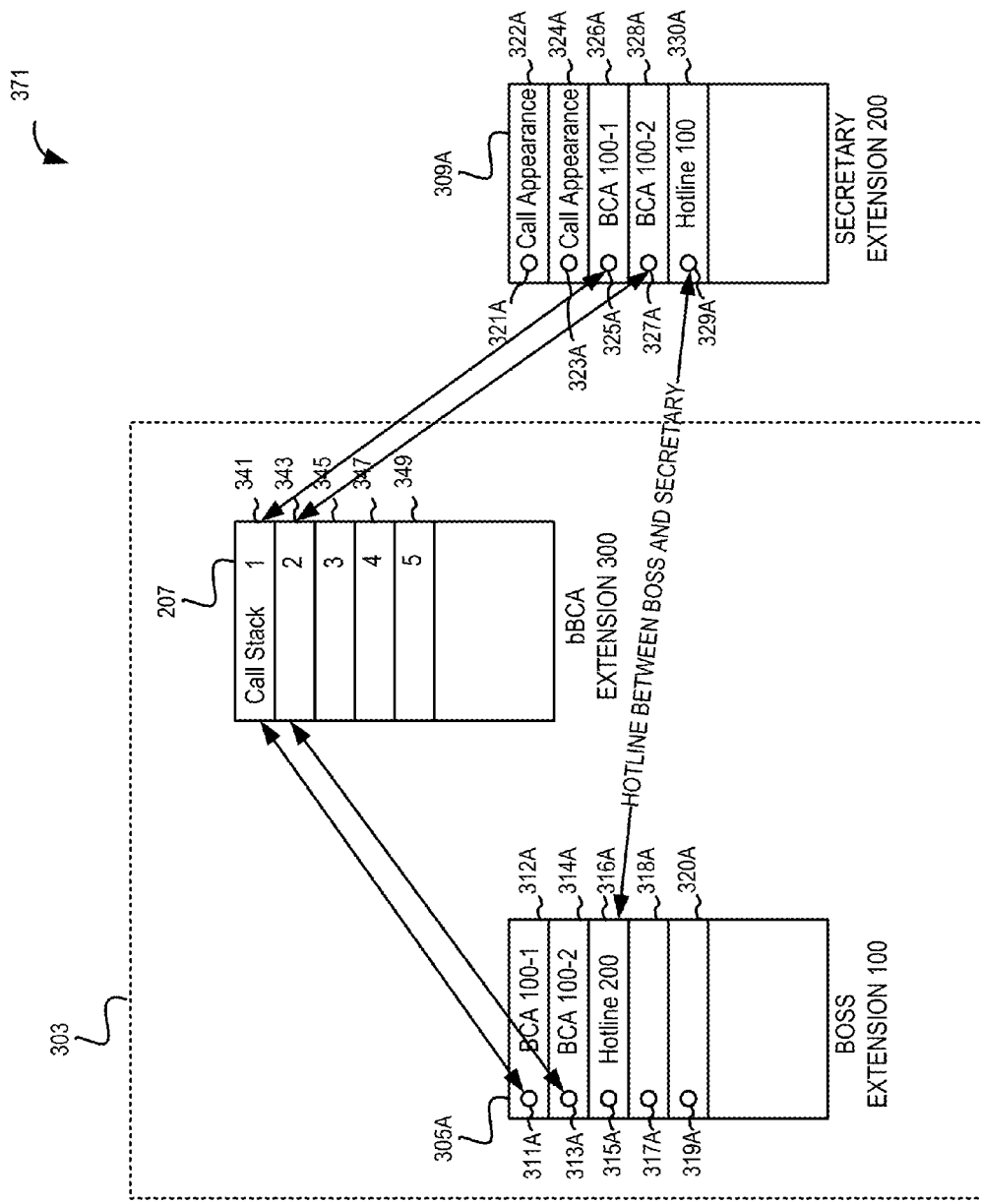
FIGS. 3A-3C illustrates a block diagram of a boss extension associated with a boss bridged call appearance extension ("bBCA extension") shared with a secretary extension according to one embodiment of the present invention.
Figure 3B:
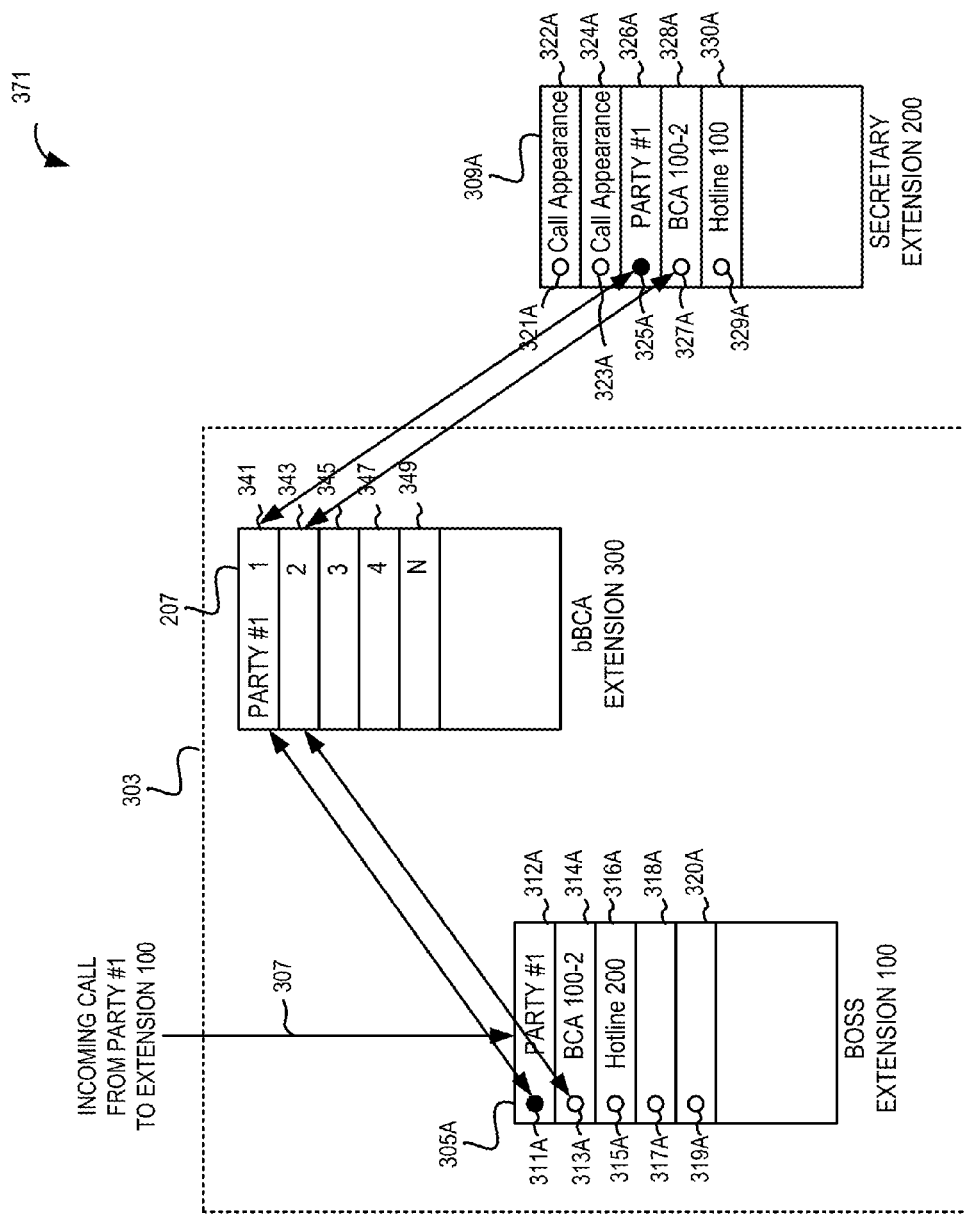
Figure 3C:
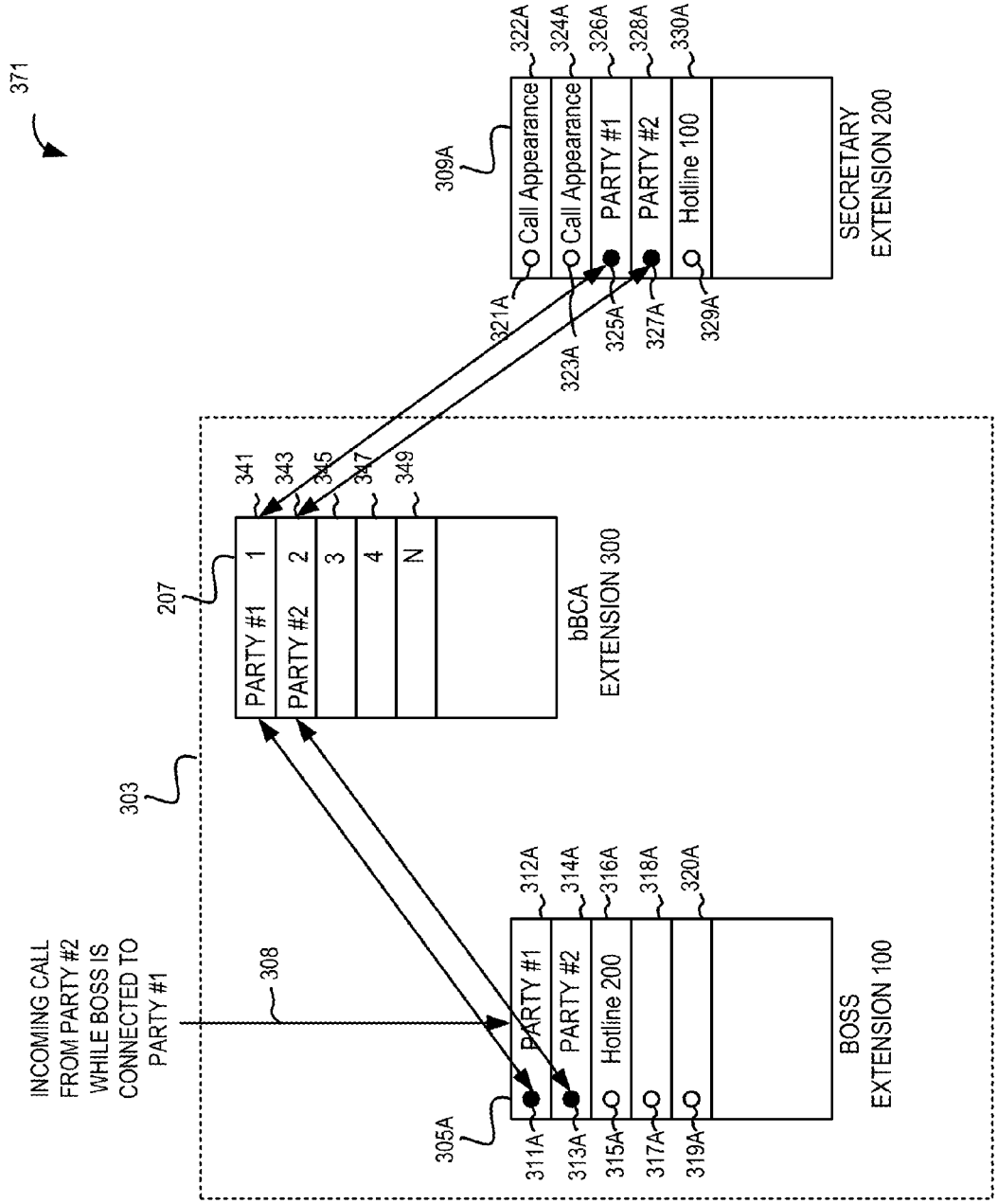

FIGS. 3A-3C depict, among other things, different states of a boss extension 100, BCA extension 300 and secretary extension 200 in processing a call.

1. The Boss Extension

FIG. 3A illustrates a block diagram of a configuration of the system 371 in which a boss extension 100 is associated 303 with a boss bridged call appearance extension (the "bBCA extension") 300 shared with a secretary extension 200, according to an embodiment of the present invention. Here, the boss extension 100 is a monitored extension, the secretary extension 200 is the proxy extension and the bBCA extension 300 is the BCA extension.

The boss extension 100 is associated 303 with the bBCA extension 300. The boss extension 100 is also associated with a device (not shown) having a display 305A and any number of programmable buttons. For example, the device is an IP phone (such as IP phone 122A) or a mobile phone (such as mobile phone 108), and the display 305A is a display on the IP phone or mobile phone. The device can also be a softphone, and the display 305A is a display on a device associated with a softphone (such as a computer monitor).

In the illustrated embodiment, the display 305A has five buttons 311A, 313A, 315A, 317A, 319A. Each button 311A, 313A, 315A, 317A, 319A is associated with a call option position on the display 305A. For example: button 311A is associated with a first call option position 312A; button 313A is associated with a second call option position 314A; button 315A is associated with a third call option position 316A; button 317A is associated with a fourth call option position 318A; and button 319A is associated with a firth call option position 320A. The call option positions 312A, 314A, 316A, 318A, 320A depict call options for the boss. For example, if the boss presses button 311A, then the boss is connected to the call displayed in the first call option position 312A (e.g., the call on the first line of the boss display 305A). Similarly, if the boss presses button 313A, then the boss is connected to the call displayed for the second call option position 314A (e.g., the call on the second line of the boss display 305A).

In one embodiment, any number of the buttons 311A, 313A, 315A, 317A, 319A are programmed to function as bridged call appearance buttons. For example, in FIG. 3A, the button 311A and first call option position 312A are programmed to provide a bridged call appearance of a different portion of the call stack 207. In other words, the arrow between the button 311A and the call stack 207 indicates that calls made available as a call option in a first call stack position 341 are accessible by a user of the boss extension 100 by pressing button 311A. Furthermore, a GUI depicting the call available in the first call stack position 341 is displayed on the first call option position 312A of the display 305A. The functionality of the above described programming is described further with reference to FIGS. 3B-3C, 4A-4D, 5A-5C, 6A and 6B.

Button 313A and the second call option position 314A are programmed to provide a bridged call appearance of a portion of the call stack 207 similar to the functionality described above for button 311A and the first call option position 312A. The arrow between the button 313A and the call stack 207 indicates that calls made available as a call option in a second call stack position 343 are accessible by a user of the boss extension 100 by pressing button 313A. Furthermore, a GUI depicting the call available in the second call stack position 343 is displayed on the second call option position 314A of the display 305A. The functionality of the above described programming is described further with reference to FIGS. 3B-3C, 4A-4D, 5A-5C, 6A and 6B.

Button 315A and the third call option position 316A are programmed to provide a dedicated hotline to extension 200 that communicatively interconnects the boss extension 100 and the secretary extension 200. The arrow between the button 315A and the secretary extension 200 indicates that a user of a device associated with either the boss extension 100 can connect a hotline call to the secretary extension by pressing the button 315A. This hotline call connects to a hotline call option position 329A described below for the secretary extension 200. The functionality of the above described programming is described further with reference to FIGS. 3B-3C, 4A-4D, 5A-5C, 6A and 6B, and in particular, FIGS. 4C, 5A-5C, 8A and 8B.

Buttons 317A and the fourth call option position 318A, as well as button 319A and the fifth call option position 320A, are not programmed to be used with the shared call stack or as hotline buttons, and remain available for future programming. In one embodiment the buttons that are not programmed for use with the shared call stack are programmed as call appearance buttons that can later be programmed to either be used with the shared call stack or as hotline buttons.

2. The Secretary Extension

The secretary extension 200 is associated with a device (not shown) having a display 309A and any number of programmable buttons. For example, the device is an IP phone (such as IP phone 122A) or a mobile phone (such as mobile phone 108), and the display 309A is a display on the IP phone or mobile phone. The device can also be a softphone, and the display 309A is a display on a device associated with a softphone (such as a computer monitor).

In the illustrated embodiment, the display 309A has five buttons 321A, 323A, 325A, 327A, 329A. Each button 321A, 323A, 325A, 327A, 329A is associated with a call option position on the display 309A. For example: button 321A is associated with a first call option position 322A; button 323A is associated with a second call option position 324A; button 325A is associated with a third call option position 326A; button 327A is associated with a fourth call option position 328A; and button 329A is associated with a firth call option position 330A. The call option positions 322A, 324A, 326A, 328A, 330A depict call options for the secretary. For example, if the secretary presses button 321A, then the secretary is connected to the call option displayed in the first call option position 322A. Similarly, if the secretary presses button 323A, then the secretary is connected to the call option displayed for the second call option position 324A.

In one embodiment, any number of the buttons 321A, 323A, 325A, 327A, 329A are conventional call appearance buttons programmed to function as bridged call appearance buttons. However, any number of the buttons 321A, 323A, 325A, 327A, 329A can also be programmed to provide a conventional call appearance of incoming calls for the secretary extension 200. For example, in FIG. 3A, the button 321A and first call option position 322A are programmed to provide a conventional call appearance of an incoming call for the secretary extension 200. In other words, if the device associated with the secretary extension 200 receives an incoming call for the secretary extension 200 or places an outgoing call from the secretary extension 200, the device associated with the secretary extension 200 causes the display 309A to depict a GUI of the incoming call in the first call option position 322A. A user of the device associated with the secretary extension 200 can access this call option by pressing button 321A.

The button 323A and the second call option position 324A are also programmed to provide a conventional call appearance of an incoming call for the secretary extension 200. In other words, if the device associated with the secretary extension 200 receives a second incoming call for the secretary extension 200 or places an outgoing call from the secretary extension 200, at a time when the first call option position 322A is occupied with a call option, then the device associated with the secretary extension 200 causes the display 309A to depict a GUI of the incoming call in the second call option position 324A. A user of the device associated with the secretary extension 200 can access this call option by pressing button 323A.

The button 325A and the third call option position 326A are programmed to provide a bridged call appearance of a portion of the call stack 207. In other words, the arrow between the button 325A and the call stack 207 indicates that calls made available as a call option in a first call stack position 341 are accessible by a user of the secretary extension 200 by pressing button 325A. Furthermore, a GUI depicting the call available in the first call stack position 341 is displayed on the third call option position 326A of the display 309A. The functionality of the above described programming is described further with reference to FIGS. 3B-3C, 4A-4D, 5A-5C, 6A and 6B.

Button 327A and the fourth call option position 328A are also programmed to provide a bridged call appearance of a portion of the call stack 207 similar to the functionality described above for button 325A and the third call option position 326A. The arrow between the button 327A and the call stack 207 indicates that calls made available as a call option in a second call stack position 343 are accessible by a user of the secretary extension 200 by pressing button 327A. Furthermore, a GUI depicting the call available in the second call stack position 343 is displayed on the fourth call option position 328A of the display 305A. The functionality of the above described programming is described further with reference to FIGS. 3B-3G, 4A-4D, 5A-5C, 6A and 6B.

Button 329A and the fifth call option position 330A are programmed to provide a dedicated hotline to extension 100 that communicatively interconnects the secretary extension 200 and the boss extension 100. The arrow between the button 329A and the boss extension 100 indicates that a user of a device associated with either the secretary extension 200 can connect a hotline call to the boss extension by pressing the button 329A. This hotline call connects to the hotline call option position 316A described above for the boss extension 100. The functionality of the above described programming is described further with reference to FIGS. 3B-3C, 4A-4D, 5A-5C, 6A and 6B, and in particular, FIGS. 4C, 5A-5C, 8A and 8B.

3. The bBCA Extension

The bBCA extension 300 includes a call stack 207 for the boss extension 100. Portions 341, 343 of the call stack 207 are shared with the secretary extension 200. The call stack 207 provides a portion of the call options for the boss extension 100 and a portion of the call options for the secretary extension. The call stack 207 has any number of positions, and five are shown in FIG. 3A by way of example. In the depicted embodiment, the call stack 207 has a first call stack position 341, a second call stack position 343, a third call stack position 345, a fourth call stack position 347 and a fifth call stack position 349.

Button 311A and call option position 312A for the boss extension 100 are associated with the first call stack position 341. This association is indicated by the arrow between the first call option button 311A for the boss extension 100 and the first call stack position 341. Similarly, button 325A and call option position 326A for the secretary extension 200 are also associated with the first call stack position 341. In other words, the first call stack position 341 in the boss' call stack 207 is shared with the secretary extension 200. This association is indicated by the arrow between the third call option button 325A for the secretary extension 200 and the first call stack position 341.

Since button 311A and call option position 312A for the boss extension 100 are associated with the first call stack position 341, any call made available as call options in the first call stack position 341 is displayed in the first call option position 312A. If the boss presses the button 311A, the monitoring device 132 will enable the boss to perform call functions on the call such as, for example: answering the call; transferring the call; sending the call to voicemail; and etc. Similarly, since button 325A and the third call option position 326A for the secretary extension 200 are also associated with the first call stack position 341, any call made available as a call option in the first call stack position 341 is displayed in the third call option position 326A for the secretary extension 200 at the same time they are displayed on the boss extension 100 in the first call option position 312A. If the secretary presses the button 325A, the monitoring device 132 will enable the secretary to perform call functions on the call. In one embodiment, if either the secretary or the boss performs a call function on a shared call, the performed function will be indicated on the other's display 305A/309A. For example, if the secretary transfers the call to some other extension, the call is removed from the call stack 207, and is also removed from both call option position 312A for the boss extension 100 and call option position 326A for the secretary extension 200.

Button 313A and call option position 314A for the boss extension 100 are associated with the second call stack position 343. This association is indicated by the arrow between the second call option button 313A and the second call stack position 343. Similarly, button 327A and call option position 328A for the secretary extension 200 are also associated with the second call stack position 343. In other words, the second call stack position 343 in the boss' call stack 207 is shared with the secretary extension 200. This association is indicated by the arrow between the fourth call option button 327A for the secretary extension 200 and the second call stack position 343.

Since button 313A and call option position 314A for the boss extension 100 are associated with the second call stack position 343, any call made available as a call option in the second call stack position 343 is displayed in the second call option position 314A. If the boss presses the button 313A, the monitoring device 132 will enable the boss to perform similar call functions as described above for the instances where the boss presses the first button 311A. Similarly, since button 327A and the fourth call option position 328A for the secretary extension 200 are also associated with the second call stack position 343, any call made available as a call option in the second call stack position 343 is displayed in the fourth call option position 328A for the secretary extension 200 at the same time they are displayed on the boss extension 100 in the second call option position 314A. If the secretary presses the button 327A, the monitoring device 132 will enable the secretary to perform call functions on the call. In one embodiment, if either the secretary or the boss performs a call function on the shared call, the performed function will be indicated on the other's display 305A/309A as described above for the first call stack position 341.

In the depicted embodiment, the first call stack position 341 and the second calls stack position 343 are shared with the secretary extension 200. The secretary can therefore use the device associated with the secretary extension 200 to perform call functions on calls using the first call stack position 341 and the second calls stack position 343. For example, the secretary can park calls in a shared call stack position 341, 343, and/or perform other call functions on calls using the shared call stack positions 341/343. Since the shared call stack positions 341, 343 are also associated with the boss extension 100, the boss can also perform call functions on calls using the shared call stack positions 341, 343.

4. Operation of the Boss Bridged Call Appearance

FIG. 3B illustrates a block diagram of a boss extension 100 associated with a bBCA extension 300 shared with a secretary extension 200, according to one embodiment of the present invention. This embodiment includes similar components to those described above for FIG. 3A so that description will not be repeated here. Like reference numerals have been used for like components with similar functionality. However, in FIG. 3B a party #1 is calling the boss extension 100 as indicated by arrow 307. The incoming call is redirected to the bBCA extension 300. Since no other calls are pending in the call stack 207 at the time the incoming call from the party #1 is received by the bBCA extension 300, the incoming call is made available as a call option in the first call stack position 341. Since button 311A and call option position 312A for the boss extension 100 are associated with the first call stack position 341, the call from party #1 is made available as a call option in the first call stack position 341 and is displayed in the first call option position 312A. The GUI manager module 256 updates the GUI for the display 305A so that the call option position 312A depicts a call from party #1 and the button 311A blinks (as indicated by the darkened button 311A) to indicate that a user of the boss extension 100 can press button 311A to access the call available in call option position 312A and the first call stack position 341. If the boss presses the button 311A, the boss can use the monitoring device 132 to perform a call function on the call from party #1.

Similarly, since button 325A and the third call option position 326A for the secretary extension 200 are also associated with the first call stack position 341, the call from party #1 is made available as a call option in the first call stack position 341 is displayed in the third call option position 326A for the secretary extension 200 at the same time they are displayed in the third call option position 326A for the secretary extension 200. The GUI manager module 256 updates the GUI for the display 309A so that the call option position 326A depicts a call from party #1 and the button 325A blinks (as indicated by the darkened button 325A) to indicate that a user of the secretary extension 200 can press button 325A to access the call available in the third call option position 326A and the first call stack position 341.

If either the boss or the secretary perform a call function on calls available in a shared call stack position, then this function is reflected in the other's display 305A/309A. For example, assume the boss presses the button 311A to perform a call function on the call from party #1 such as answering the call. When the boss answers the call, a signal is sent to the monitoring device 132 and, responsive to this signal, the GUI manager module sends a signal to the devices associated with the boss extension 100 and the secretary extension 200 to modify the displays 305A, 309A so that the buttons 311A and 325A to indicate that that a party (here, the boss) is connected to the call with the party #1. For example, the buttons 311A and 325A are modified to a solid, non-blinking color to indicate that the call is connected to the boss. Alternatively, in one embodiment the buttons 311A and 325A show different colors to indicate who is connected to the call.

Turning now to FIG. 3C. FIG. 3C illustrates a block diagram of a boss extension 100 associated with a bBCA extension 300 shared with a secretary extension 200, according to one embodiment of the present invention. This embodiment includes similar components to the embodiment depicted in FIG. 3A described above so that description will not be repeated here. Like reference numerals have been used for like components with similar functionality. However, in FIG. 3C an incoming call from a party #2 is received while the boss is connected on a call with party #1 as indicated by the arrow 308. The incoming call from party #2 is redirected to bBCA extension 300 and made available as a call option on the next available call stack position. Here, the next available call stack position is the second call stack position 343.

The GUI manager module 256 updates the GUI for the display 305A so that the call option position 313A depicts a call from party #2 and the button 313A blinks (as indicated by the darkened button 313A) to indicate that a user of the boss extension 100 can press button 313A to access the call available in call option position 314A and the second call stack position 343. If the boss presses the button 313A, the boss can use the monitoring device 132 to perform a call function on the call from party #2.

Similarly, the GUI manager module 256 also updates the GUI for the display 309A so that the call option position 328A depicts a call from party #2 and the button 327A blinks (as indicated by the darkened button 327A) to indicate that a user of the secretary extension 200 can press button 327A to access the call available in the fourth call option position 328A and the second call stack position 343. If the secretary presses the button 327A, the secretary can use the monitoring device 132 to perform a call function on the call from party #2.

Turning now to FIG. 4A-4D, stages for a conference call being connected between the boss, a party #1 and a party #2 are shown and described.

Figure 4A:
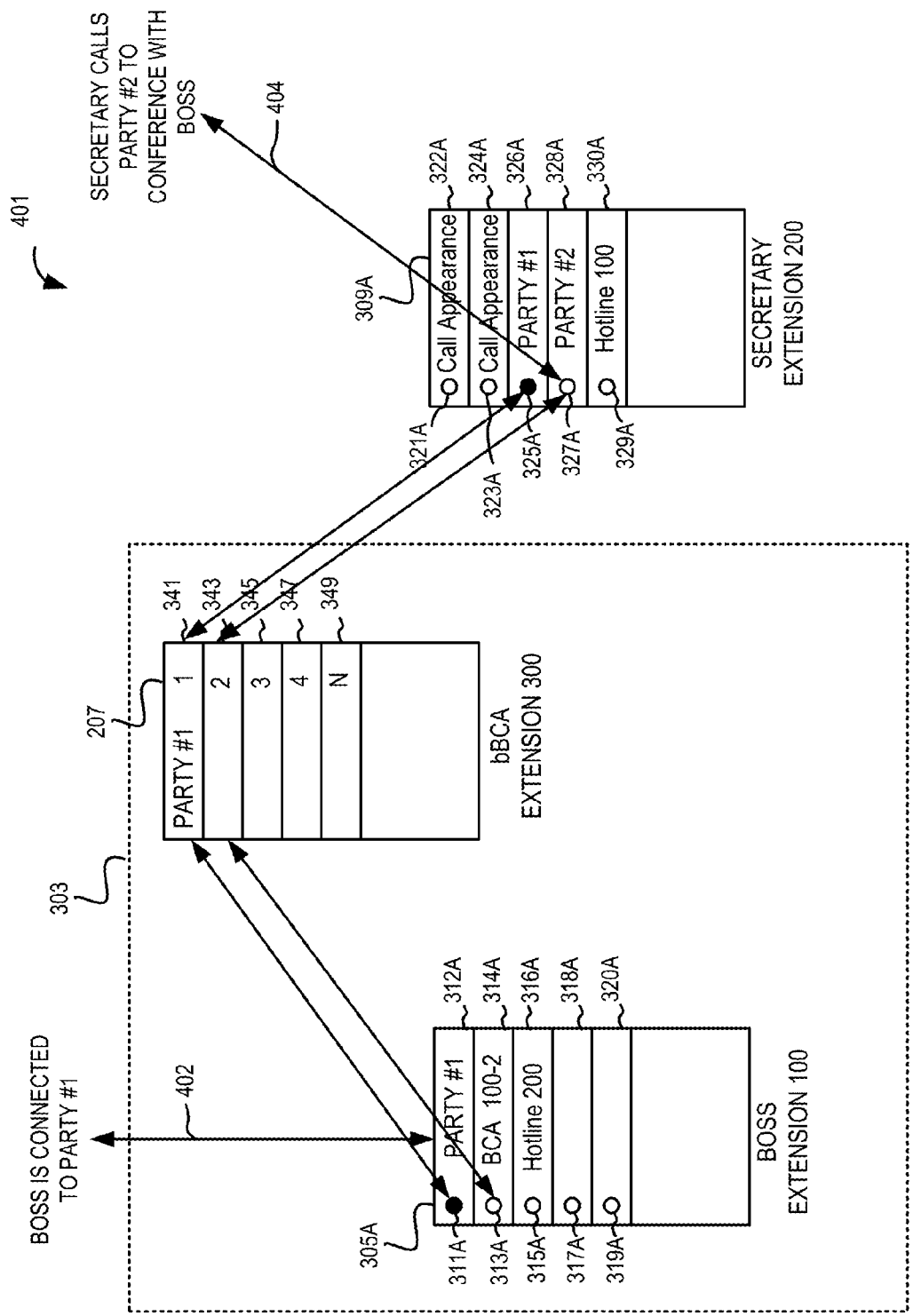
FIGS. 4A-4D illustrates a block diagram of a boss extension associated with a boss bridged call appearance extension shared with a secretary extension according to a second embodiment of the present invention.

FIG. 4A illustrates a block diagram of a system 401 in which a boss extension 100 is associated 303 with a bBCA extension 300 shared with a secretary extension 200, according to one embodiment of the present invention. This embodiment includes similar components to the embodiment described above with reference to FIGS. 3A-3C so that description will not be repeated here. Like reference numerals have been used for like components with similar functionality. However, in this embodiment the boss is connected to an ongoing phone call with party #1, as indicated by arrow 402, and desires to conference in party #2. For example, assume the boss has asked the secretary to connect a conference call between the boss, party #1 and party #2. The secretary enters an input using the device associated with the secretary extension 200 to call party #2. For example, the secretary presses button 327A and dials a phone number for party #2. As indicated by arrow 404, the device associated with the secretary extension 200 is now calling party #2.

Figure 4B:
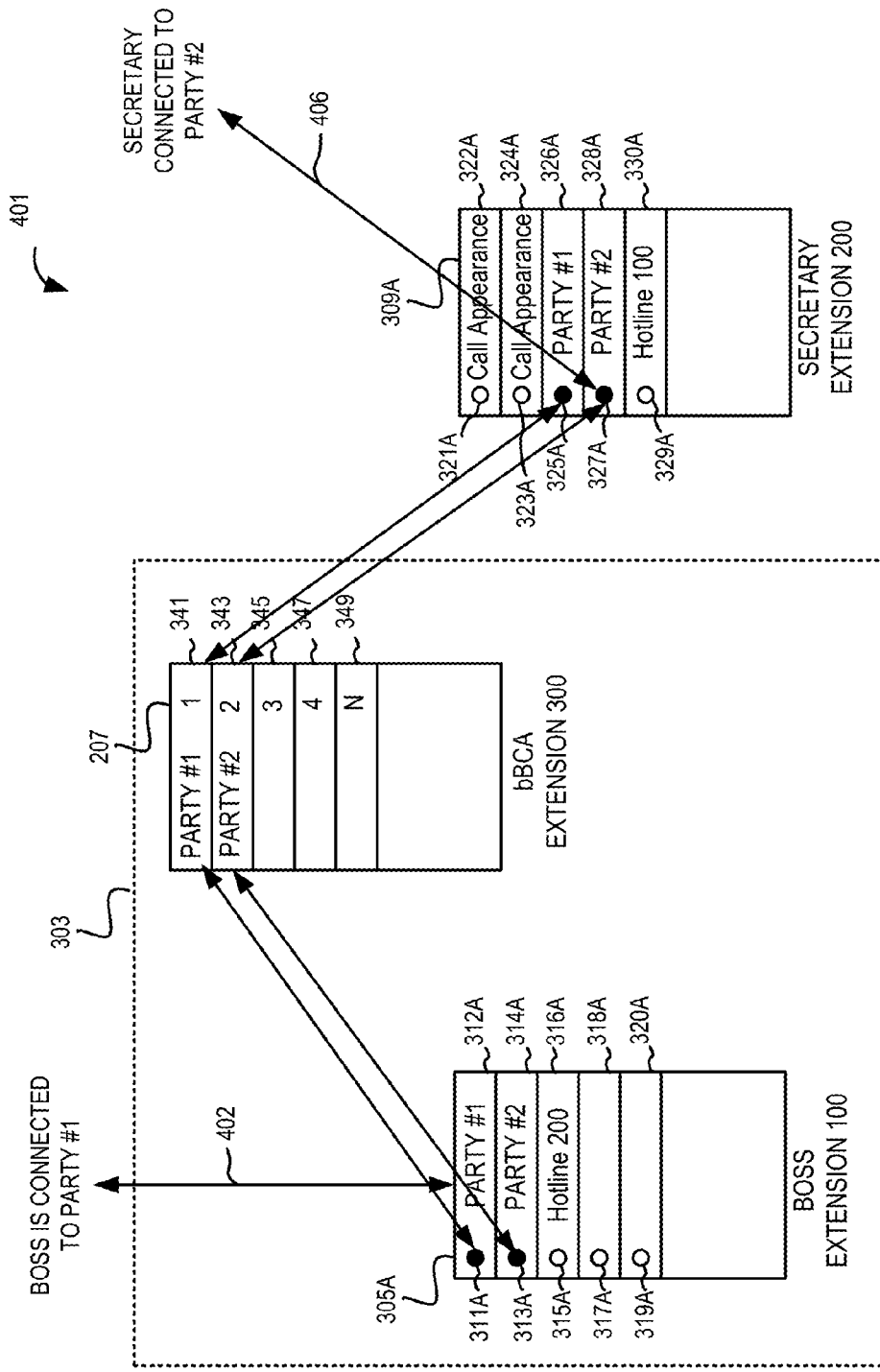

FIG. 4B continues the process began for FIG. 4A. FIG. 4B illustrates the system 401 after the boss extension 100 is connected on a call with party #1 and the secretary has used the device associated with the secretary extension 200 to enter an input to call party #2. As indicated by the arrow 406, the secretary extension 200 is now connected on a call with party #2. The secretary enters a second input using the device associated with the secretary extension 200 to park the ongoing call with the party #2. For example, the secretary presses button 327A. The call with party #2 is parked in the second call stack position 343 located on the bBCA extension 300.

The GUI manager module 256 updates the GUI for the display 305A so that the call option position 314A depicts a call from party #2 and the button 313A blinks (as indicated by the darkened button 313A) to indicate that a user of the boss extension 100 can press button 313A to access the call available in call option position 314A and the second call stack position 343. If the boss presses the button 313A, the boss can use the monitoring device 132 to perform a call function on the call from party #2.

Similarly, the GUI manager module 256 also updates the GUI for the display 309A so that the call option position 328A depicts a call from party #2 and the button 327A blinks (as indicated by the darkened button 327A) to indicate that a user of the secretary extension 200 can press button 327A to access the call available in the fourth call option position 328A and the second call stack position 343. If the secretary presses the button 327A, the secretary can use the monitoring device 132 to perform a call function on the call from party #2.

Figure 4C:
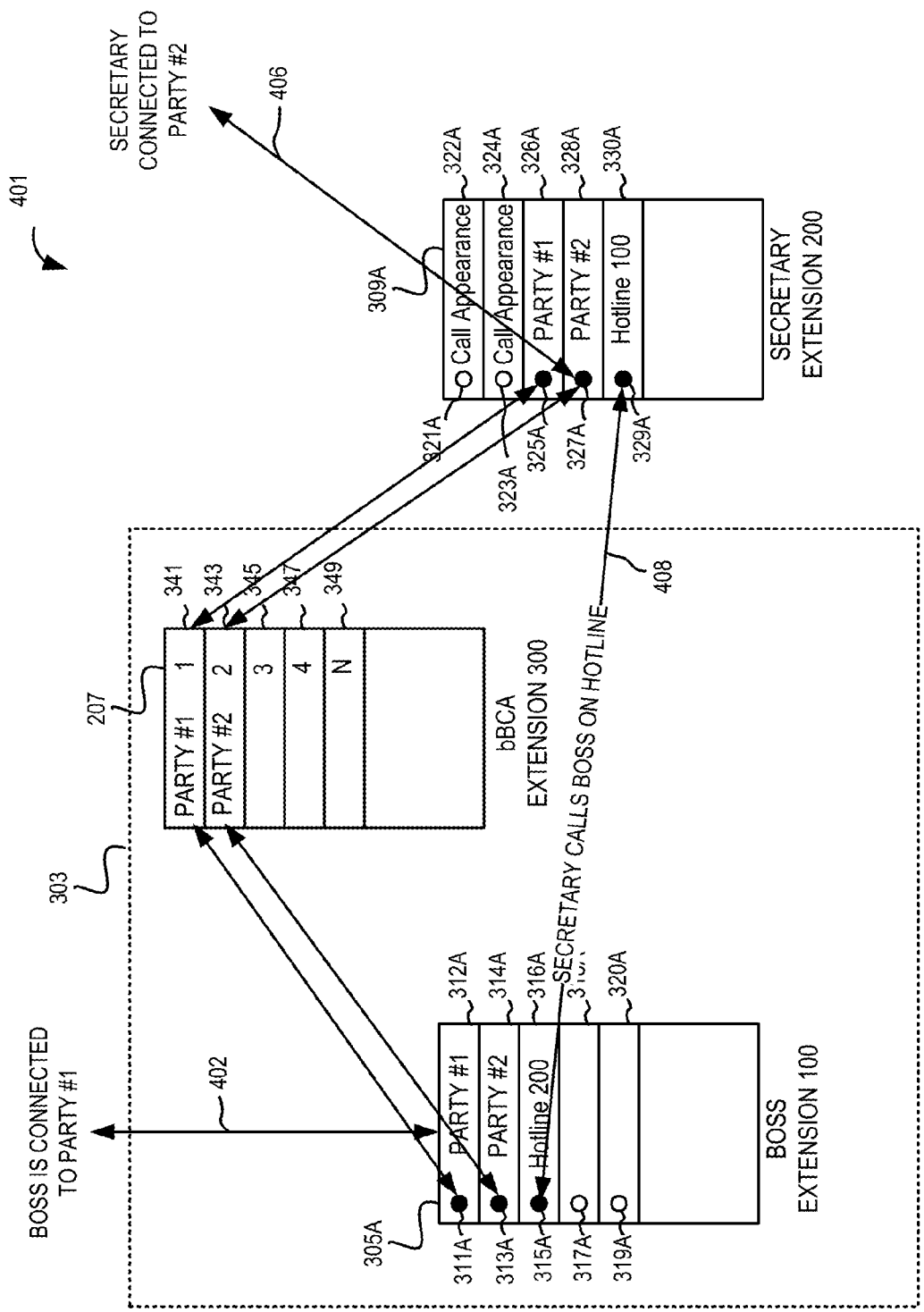

FIG. 4C continues the process and shows the system 401 with the boss extension 100 connected on a call with party #1 and the secretary extension 200 connected on a call with party #2. The call with party #2 is parked in the second call stack position 343. The secretary enters an input in the device associated with the secretary extension 200 to connect a hotline call with the boss as indicated by the arrow 408. For example, the secretary presses the button 329A. The secretary extension 200 and the boss extension 100 are now connected on a hotline call. With the hotline call connected, the secretary can tell the boss that party #2 is available for a conference call between the boss, party #1 and party #2. The boss can then enter an input in the device associated with the boss extension 100 to conference party #2 in the ongoing call between the boss and party #1. For example, the boss presses button 313A to conference in party #2 since button 313A is associated with the second call stack position 343 and the call with party #2 is parked in the second call stack position 343.

In another embodiment, the device associated with either the boss extension 100 and/or the secretary extension 200 has a conference function key. For example, the button 317A is programmed as a conference function key. The boss presses the conference function key 317A and the presses buttons associated with the party lines the boss wants to be on the conference call (e.g., button 311A and/or 313) and a conference call between those parties is connected. Likewise, the secretary can perform similar functions for the boss using the device associated with the secretary extension 200. For example, button 321A is programmed as a conference function key. The secretary presses the conference function key 317A and presses buttons associated with the party lines the boss wants to be on the conference call (e.g., button 325A and/or 327A) and a conference call between those parties is connected.

In one embodiment, the boss does not have to enter an input for the hotline call to be connected and the secretary's hotline call is connected after the secretary presses button 329A. For example, the secretary presses button 329A, the monitoring device 132 connects the secretary extension 200 to the boss extension 100 and the secretary can speak directly to the boss.

Figure 4D:
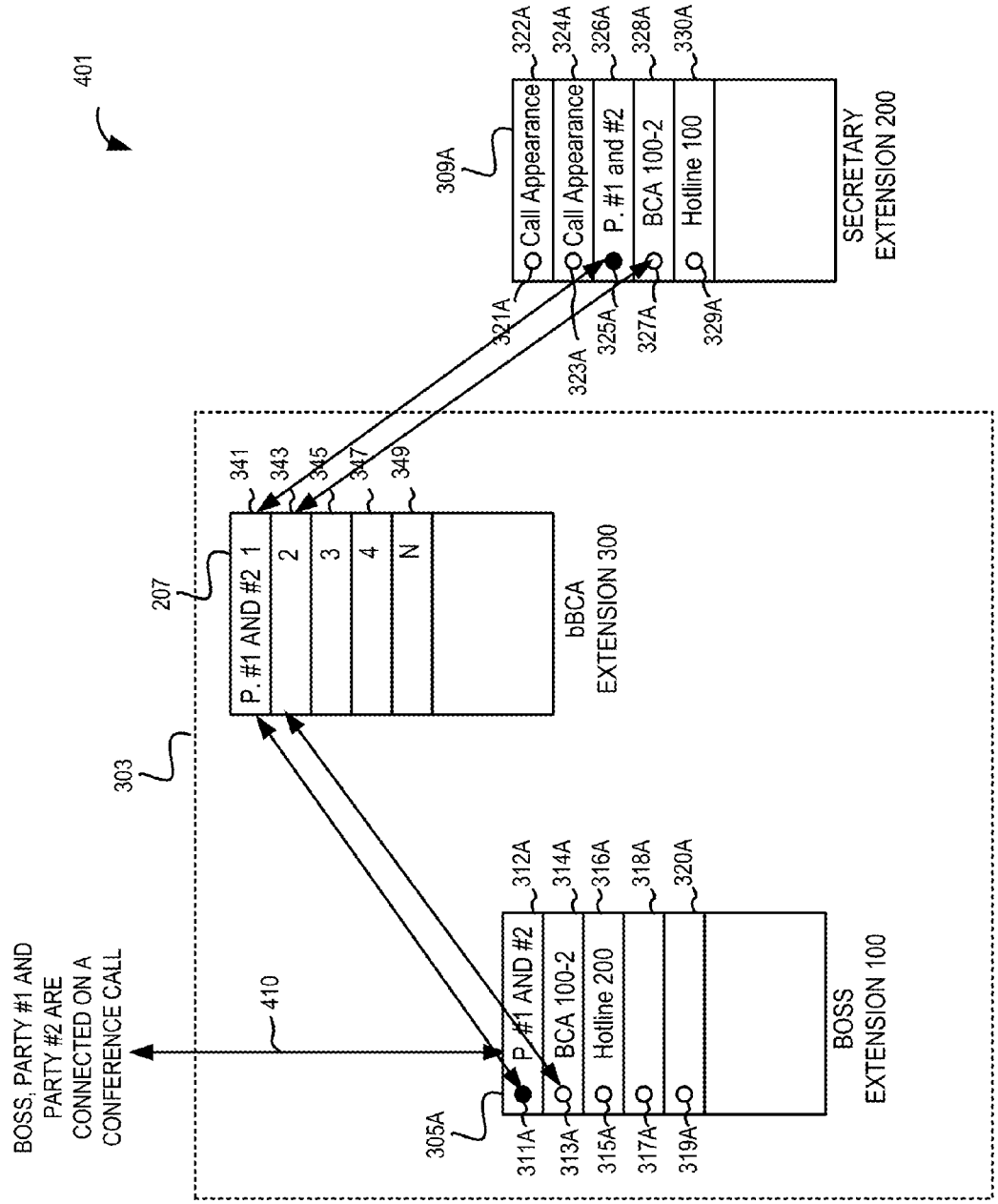

FIG. 4D continues the process and shows the system 401 in which the boss extension 200 is connected on a conference call with party #1 and party #2 as indicated by the arrow 410. The call with party #2 is no longer parked in the second call stack position 343 since party #2 is now conference in with the call between the boss and party #1. Accordingly, the second call stack position 343 is now open and available for a new call.

The GUI manager module 256 updates the GUI for the display 305A so that the call option position 314A depicts a second call option position 314A as being available for a call and the button 313A stops blinking (as indicated by the non-darkened button 313A). The GUI manager module 256 also updates the GUI for the display 305A so that the call option position 312A depicts the boss extension 100 using the first call option position 312A for a conference call with party #1 and party #2 and the button 311A is modified to a solid, non-blinking color (as indicated by the darkened button 311A).

Similarly, the GUI manager module 256 also updates the GUI for the display 309A so that the call option position 328A is depicted as available for a call and the button 327A stops blinking (as indicated by the non-darkened button 327A). The GUI manager module 256 also updates the GUI for the display 309A so that the call option position 326A depicts the boss extension 100 on a conference call with party #1 and party #2 and the button 325A is modified to a solid, non-blinking color (as indicated by the darkened button 325A).

Figure 5A:
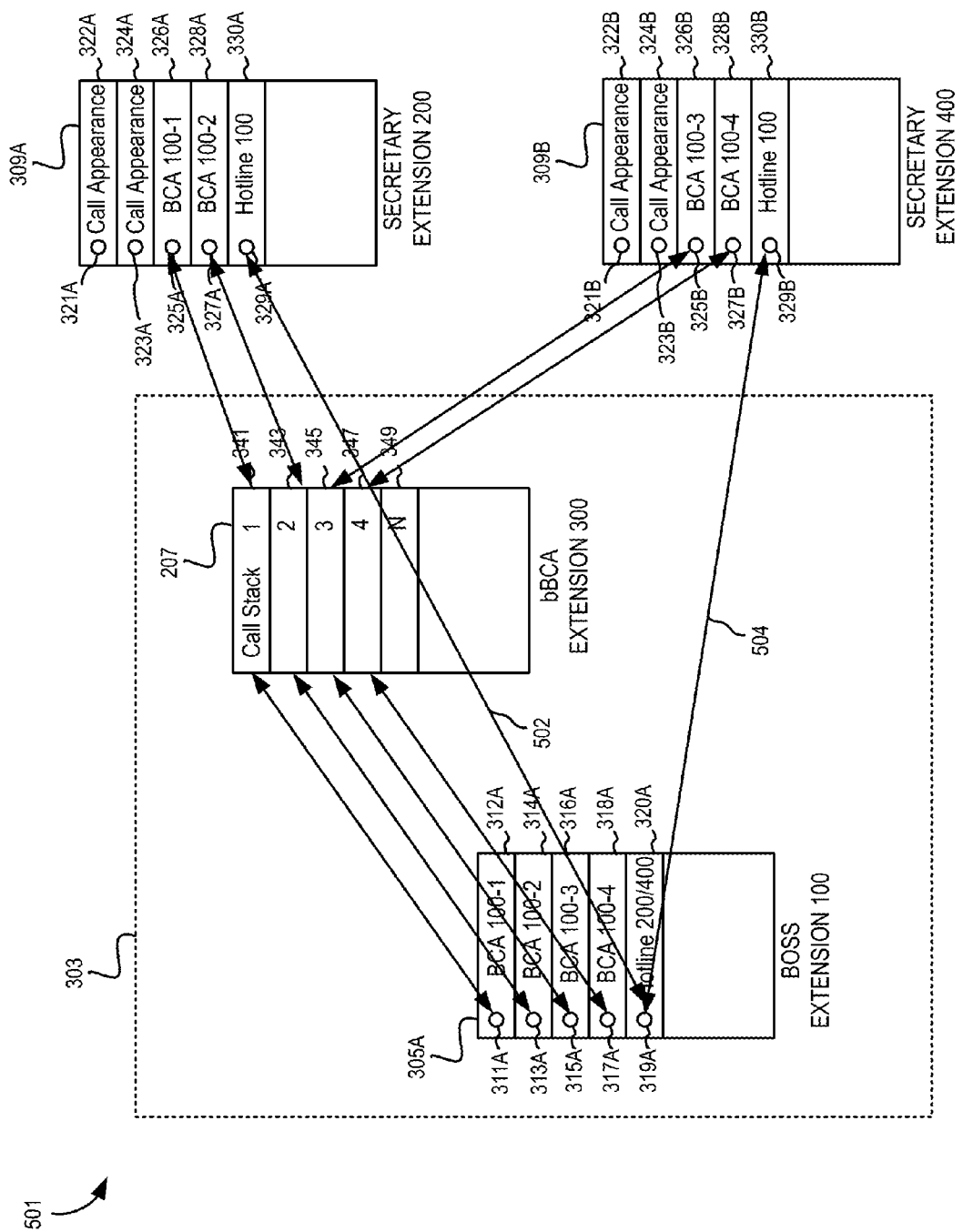
FIGS. 5A-5C illustrates a block diagram of a boss extension associated with a boss bridged call appearance extension shared with multiple secretary extensions according to a third embodiment of the present invention.

Turning now to FIG. 5A. FIG. 5A illustrates a block diagram of a system 501 having a boss extension 100 associated 303 with a bBCA extension 300 shared with multiple secretary extensions 200, 400, according to one embodiment of the present invention. The system 501 includes similar components to the system 371 described above so that description will not be repeated here. Like reference numerals have been used for like components with similar functionality. However, in this system 501 there is a first secretary extension 200 and a second secretary extension 400. The second secretary extension 400 is similar to the first secretary extension 200 and provides similar functionality as the first secretary extension 200.

Also different are the following: the third button 315A and the third call option position 316A for the boss extension 100 is associated with the third call stack position 345 for the bBCA extension 300; the third call stack position 345 is associated with the third button 325B and the third call option position 326B for the second secretary extension 400; the fourth button 317A and the fourth call option position 318A for the boss extension 100 is associated with the fourth call stack position 347 for the bBCA extension 300; the fourth call stack position 347 is associated with the fourth button 327B and the fourth call option position 328B for the second secretary extension 400; and the fifth button 319A for the boss extension 100 is programmed to function as a hotline to both the first secretary extension 200 and the second secretary extension 400. The boss presses the hotline button 319A and the monitoring device 132 places a hotline call to the first secretary extension 200 and the second secretary extension 400; if both secretaries answer, then the monitoring device 132 conferences both secretaries on a call with the boss. If only one secretary answers the hotline call, then the monitoring device 132 connects that secretary on a hotline call with the boss. The arrows between button 319A of the boss extension 100 and button 329A of the first secretary extension 200 and button 329B of the second secretary extension 400 indicate bidirectional hotlines 502, 504 between the boss extension 100 and the secretary extensions 200, 400. Thus, here the hotline button 319A has a one-to-many relationship with associated secretary extensions 200, 400. It will be understood to one having ordinary skill in the art that the hotline button 319A can be programmed to be associated with any number of secretary extensions.

Figure 5B:
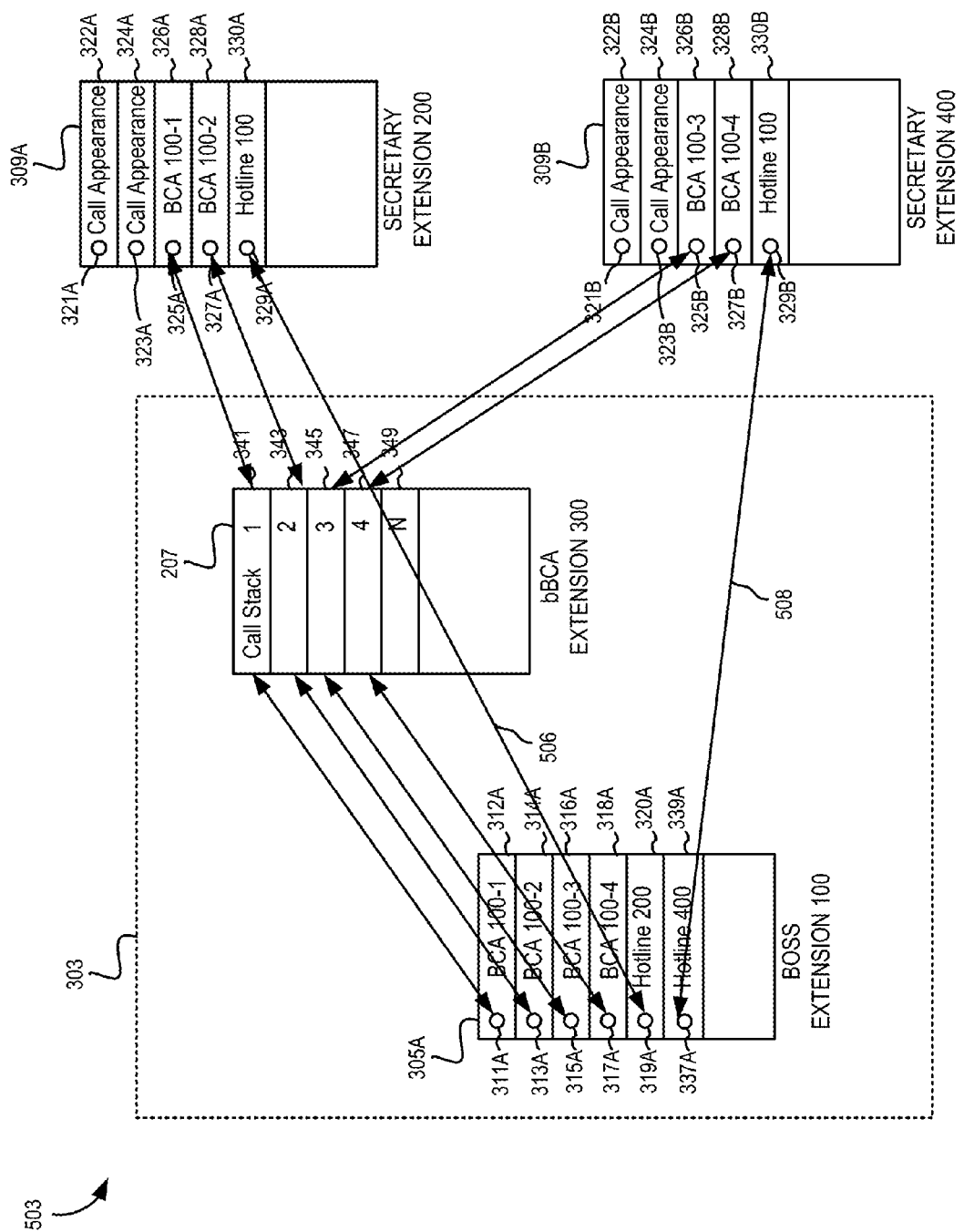

Turning now to FIG. 5B, depicted is a block diagram of a system 503 in which a boss extension 100 is associated 303 with a bBCA extension 300 shared with multiple secretary extensions 200, 400, according to one embodiment of the present invention. The system 503 includes similar components to the system 501 described above so that description will not be repeated here. Like reference numerals have been used for like components with similar functionality. However, the system 503 there are two hotline buttons 319A, 337A having a one-to-one relationship with the first secretary extension 200 and the second secretary extension 400, respectively, as indicated by the arrows 506, 508.

Figure 5C:
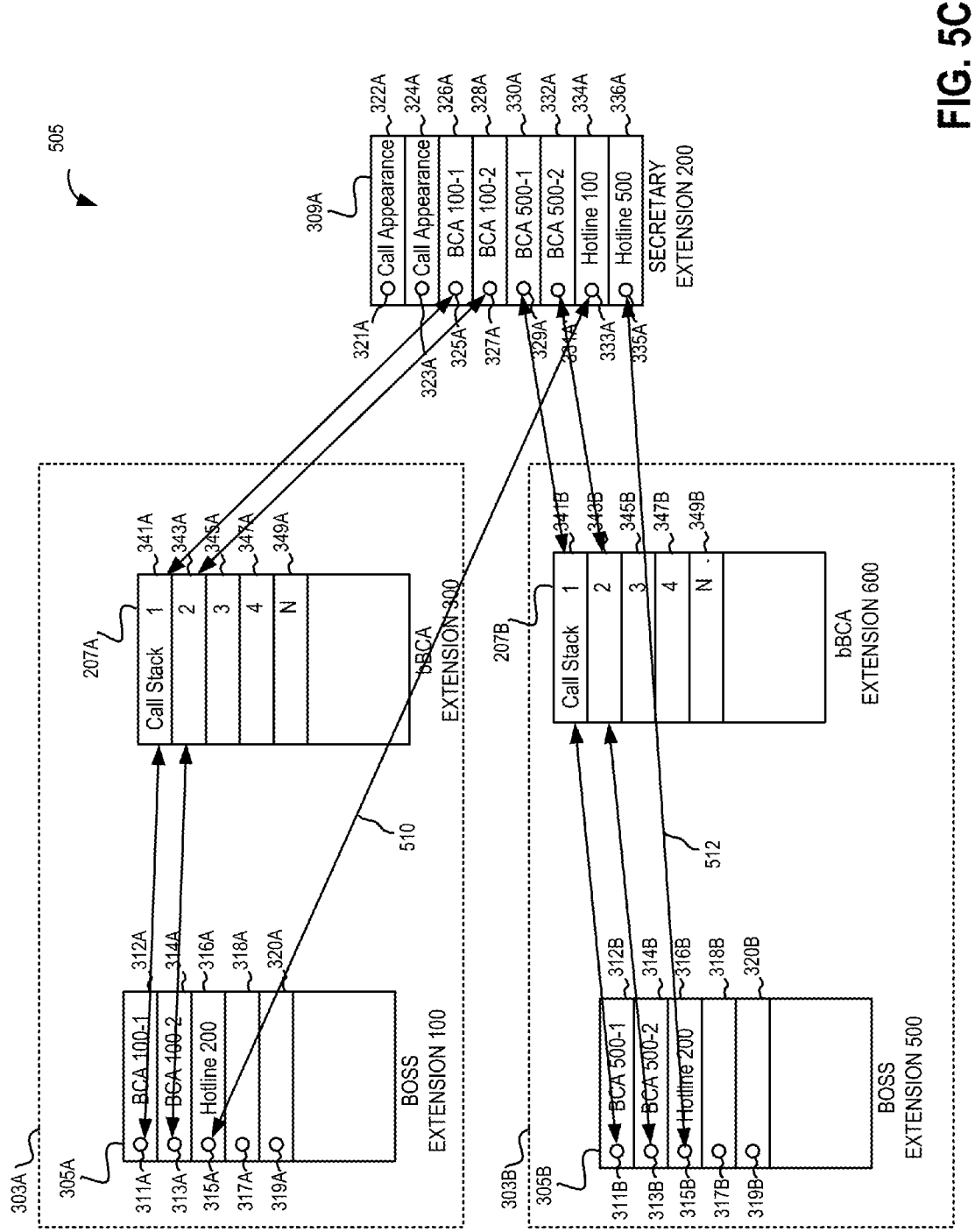

Turning now to FIG. 5C, depicted as a system 505 in which multiple boss extensions 100, 500 are associated 303A, 303B with multiple bBCA extensions 300, 600 shared with a single secretary extension 200, according to one embodiment of the present invention. The system 505 includes similar components to the system 505 described above so that description will not be repeated here. Like reference numerals have been used for like components with similar functionality. However, in this system 505 there is a first boss extension 100 and a second boss extension 500, as well as a first bBCA extension 300 and a second bBCA extension 600. The first boss extension 100 is associated 303A with the first bBCA extension 300 and shares a portion of the call stack 207A with the secretary extensions 200. The second boss extension 500 is associated 303B with the second bBCA extension 600 and shares a portion of the calls stack 207B with the secretary extension 200. The second boss extension 500 is similar to the first boss extension 100 and the second bBCA extension 600 is similar to the first bBCA extension. The secretary extension 200 is similar to the secretary extension 200 depicted in the previous figures, except here the secretary extension 200 has additional buttons 331A, 333A, 335A and additional call option positions 332A, 334A, 336A.

Also different for the system 505 is the following: the first button 311B and the first call option position 312B of the second boss extension 500 is associated with the first call stack position 341B of the second bBCA extension 600; the first call stack position 341B is associated with the fifth button 329A and the fifth call option position 330A of the secretary extension 200; the second button 313B and the second call option position 314B of the second boss extension 500 is associated with the second call stack position 343B of the second bBCA extension 600; the second call stack position 343B is associated with the sixth button 331A and the sixth call option position 332A of the secretary extension 200; the third button 315B is programmed to function as a hotline to the secretary extension 200. The arrow 510 between button 315A of the first boss extension 100 and button 333A of the secretary extension 200 indicates a hotline between the first boss extension 100 and the secretary extension 200. Similarly, the arrow 512 between button 315B of the second boss extension 500 and button 335A of the secretary extension 200 indicates a bidirectional hotline between the first boss extension 100 and the secretary extension 200.

Figure 6A:
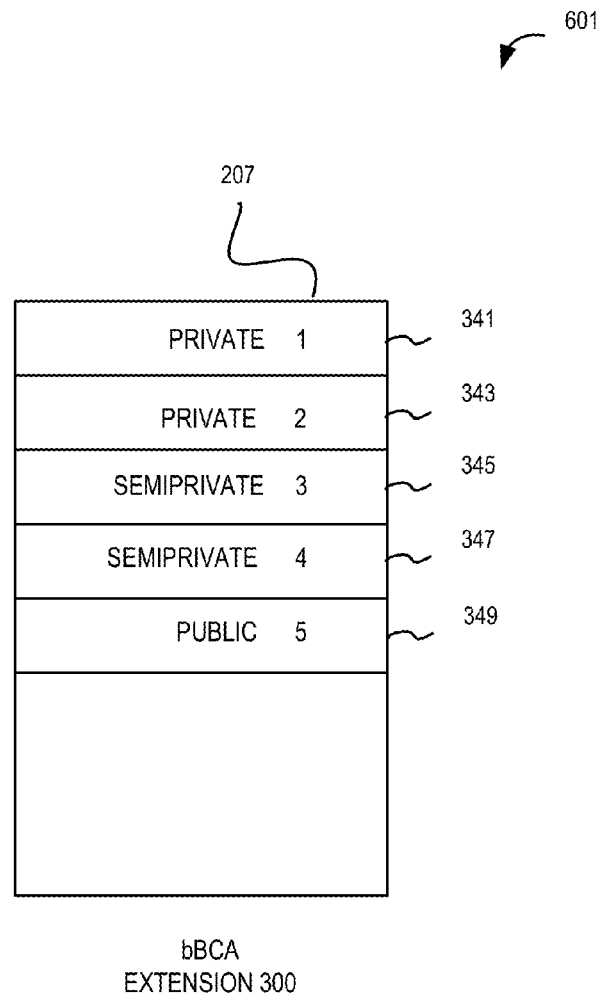
FIG. 6A illustrates a block diagram of a call stack for a boss bridged call appearance extension according to one embodiment of the present invention.

Turning now to FIG. 6A, depicted is a block diagram of a call stack 207 for a bBCA extension 300, according to one embodiment of the present invention. Call stack positions 341-349 can be designated as private, semiprivate or public.

Call stack positions that are designated as "private" are not shared with any other extension, and are only viewable and configurable by the boss extension. Private call stack positions are not shared with proxy extensions. For example, a private call stack position is not shared with any secretary extensions since secretary extensions are proxy extensions.

Call stack positions that are designated as "semiprivate" are shared only with proxy extensions specified by the boss or some other extension given permission to grant access permissions to a proxy extension. For example, a boss uses an IP phone associated with the boss extension to designate a call stack position as being "semiprivate," and shared with a particular secretary extension. The secretary can now perform call functions on calls made available as a call option in that call stack position.

Call stack positions that are designated as "public" are shared with all other call extensions. For example, a boss uses an IP phone associated with the boss extension to designate a call stack position as being public. All other devices coupled to the monitoring device 132 can perform call functions on call made available as a call option in the public call stack position.

In the depicted embodiment 601, the first call stack position 341 and the second call stack position 343 are designated as private, the third call stack position 345 and the fourth call stack position 347 are designated as semiprivate, and the fifth call stack position 349 is designated as public.

In one embodiment, the call stack 207 can be programmed by a user providing inputs to an apparatus to designate portions of the call stack as being private, semiprivate or public. For example, a user of an apparatus such as a monitoring device 132 (e.g., switch 130A or server computer 110) or a device associated with a monitored extension (e.g., IP phone 122, mobile phone 108 or a softphone) provides inputs to the apparatus to designate portions of the call stack as being private, semiprivate or public.

In another embodiment, the apparatus has a processor executing software and the user provides inputs to the software using the apparatus to designate portions of the call stack as private, semiprivate or public.

In another embodiment, the apparatus has a processor executing a wizard software program that designates the call stack positions as private, semiprivate or public based on determinations made by the wizard software program. For example, the wizard looks at a historical use of a particular boss extension, or all boss extensions as a class, and determines a configuration for the call stack positions based on this historical use. Historical use includes, for example, i.e., amount of call traffic, confidential nature of the boss' job, number of secretaries assigned to the boss, common or popular configurations of call stack positions among other bosses and/or a business policy defining or providing guidance for configuring call stack positions. In one embodiment, the wizard is software or routines executed by the configuration module 254.

Figure 6B:
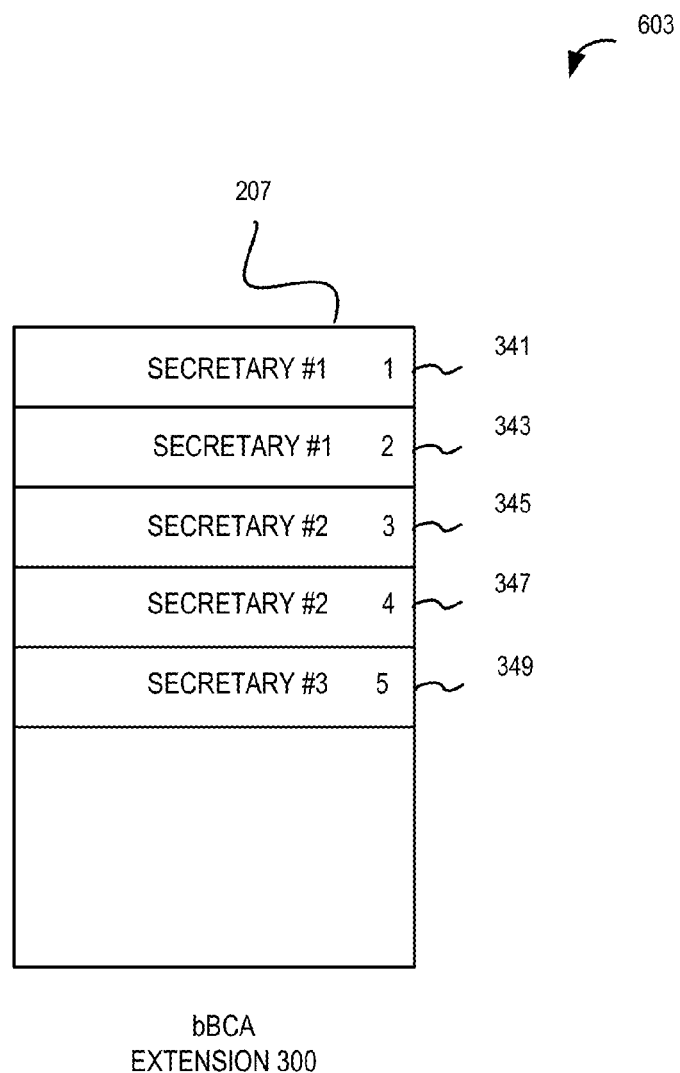
FIG. 6B illustrates a block diagram of a call stack for a boss bridged call appearance extension according to a second embodiment of the present invention.

FIG. 6B illustrates a block diagram of a call stack 207 for a bBCA extension 300, according to one embodiment of the present invention. Call stack positions can be designated as shared with particular extensions. For example, some call stack positions are shared with a first secretary extension and other call stack positions are shared with a second secretary extension. In the depicted embodiment 603, the first call stack position 341 and the second call stack position 343 are shared with a first secretary extension. Similarly, the third call stack position 345 and the fourth call stack position 347 are shared with a second secretary extension. A fifth call stack position 349 is shared with a third secretary extension.

In one embodiment, the secretary extensions associated with a monitoring device 132 can be grouped by class and different groups of are assigned to different classes. For example, a first class of secretaries handle calls originating from a first geographic location and a second class of secretaries handle calls originating from a second geographic location. The secretary extensions for the first class are associated with call stack positions 341 and 343, and the secretary extensions for the second class are associated with call stack positions 345 and 347. The monitoring device 132 places calls from the first geographic location in either call stack position 341 or 343, and calls from the second geographic location in either call stack position 345 or 347.

In one embodiment, the call stack 207 can be programmed by a user providing inputs to an apparatus to designate portions of the call stack as being shared with a particular secretary, and other portions of the call stack as being shared with different secretaries. For example, a user of an apparatus such as a monitoring device 132 (e.g., switch 130A or server computer 110) or a device associated with a monitored extension (e.g., IP phone 122, mobile phone 108 or a softphone) provides inputs to the apparatus to designate a portion of the call stack as being shared by a particular secretary extension.

In another embodiment, the apparatus has a processor executing software and the user provides inputs to the software using the apparatus to designate portions of the call stack being shared with a particular secretary.

In another embodiment, the apparatus has a processor executing a wizard software program that designates the call stack positions as being shared with different secretary extensions based on determinations made by the wizard software program (herein "the wizard"). For example, the wizard is stored in a memory such as the storage module 258 and the configuration module 254 implements the wizard. The wizard accesses a record of the historical use of a particular boss extension, or all boss extensions as a class. The wizard determines a configuration for the call stack positions based on this historical use record. Historical use includes, for example, an amount of call traffic, the job assignments for the different secretaries, past performance evaluations for the different secretary extensions, common or popular configurations of call stack positions among other bosses and/or a business policy defining or providing guidance for configuring call stack positions. The wizard can also randomly designate the different call stack positions sequentially. For example, the secretary with the lowest numbered extension (e.g., extension 200) is assigned to the first call stack position 341 and the secretary with the second lowest numbered extension (e.g., extension 400) is assigned the second call stack position 343.

E. Methods

Figure 7:
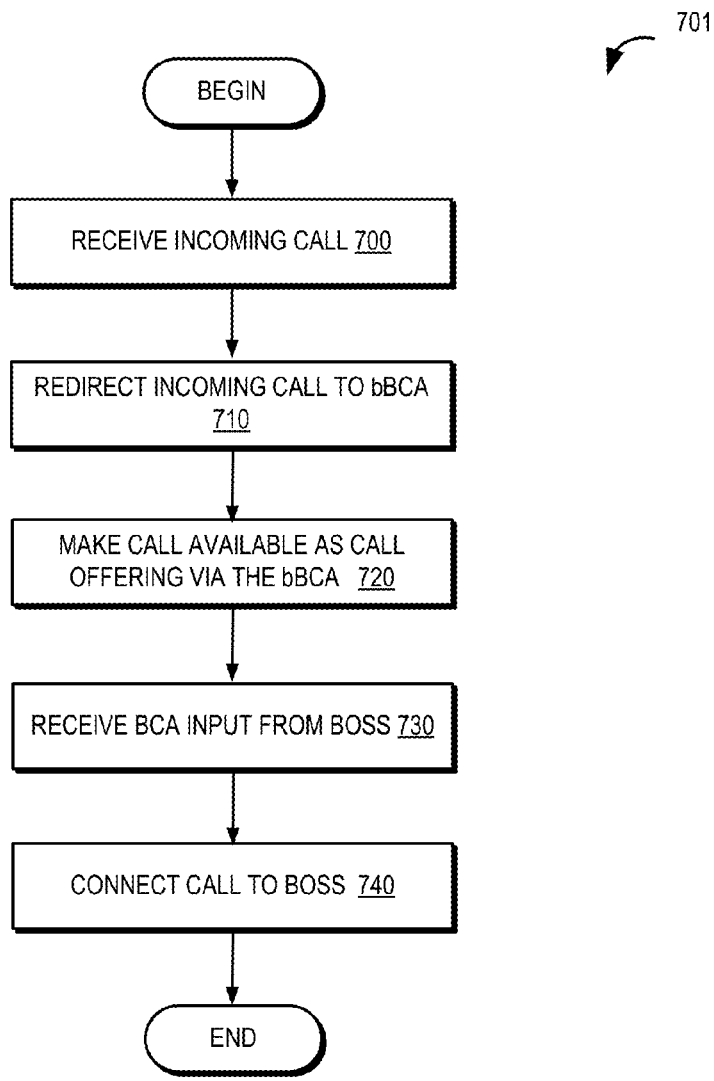
FIG. 7 illustrates a flowchart of a method performed by a monitoring device 132 for enabling a phone call incoming to a boss extension to be redirected to a bridged call appearance extension according to one embodiment of the present invention.

FIG. 7 illustrates a flowchart of a method 701 performed by a monitoring device 132 for enabling a phone call incoming to a boss extension to be redirected to a bBCA extension, according to one embodiment of the present invention. For example, the method 701 depicted in FIG. 7 corresponds to the apparatus and process depicted in FIGS. 3A and 3B.

According to the method 701, a call is received 700 at the boss extension 100. The call is redirected by the monitoring device 132 to the bBCA extension 710. The monitoring device 132 makes the call available 720 as a call offering that can be answered by either the boss extension 100 or the secretary extension 200 via the bBCA extension 300. A call offering is a call that is not yet answered, but is available via the bBCA extension 300 for answering by either a monitored extension to which the call was placed or a proxy extension for that monitored extension. The monitoring device 132 receives 730 an BCA input from the boss. For example, the boss presses the first button 311A on the device associated with the boss extension 100. The monitoring device 132 in response connects 740 the call with the boss responsive to receiving the input.

Figure 8A:
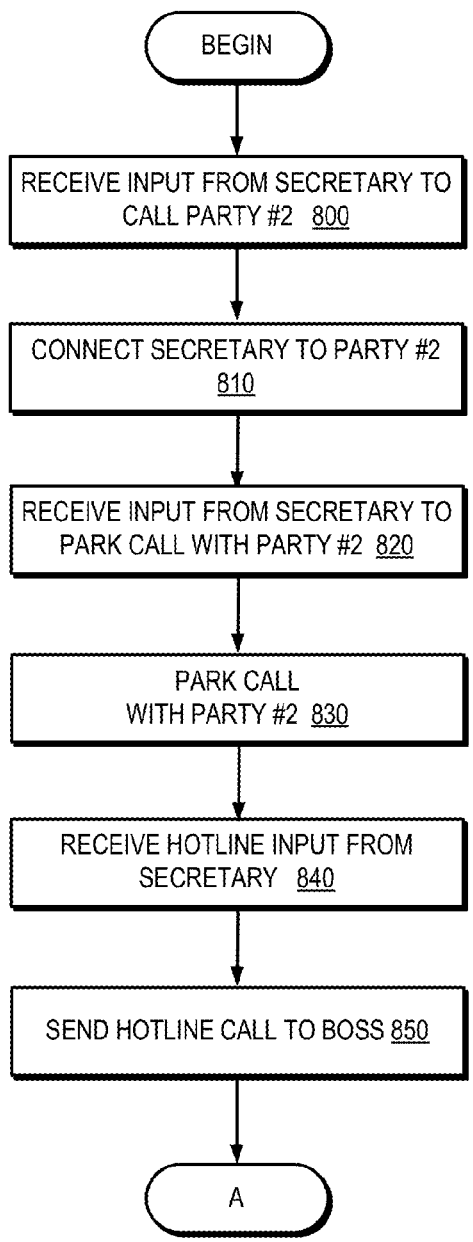
FIGS. 8A-8B illustrates a flowchart of a method performed by a monitoring device 132 for enabling secretary to set up a hotline call including the boss extension according to one embodiment of the present invention.
Figure 8B:
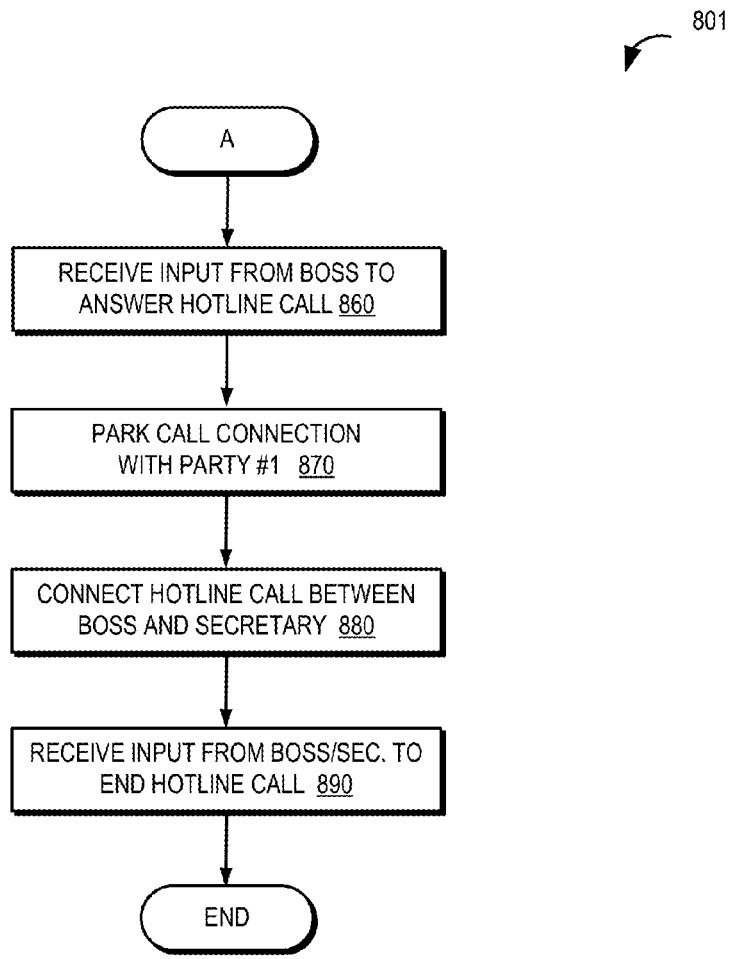

FIG. 8A-8B illustrates a flowchart of a method 801 performed by a monitoring device 132 for enabling a secretary to set up a conference call including the boss extension, according to one embodiment of the present invention. For example, the method 801 depicted in FIGS. 8A and 8B correspond to the apparatus and process depicted in FIGS. 4A-4D.

According to the method 801, the boss extension 100 is connected to an ongoing call with a party #1. The monitoring device 132 receives 800 an input from the secretary extension 200 to call a party #2. For example, the secretary dials party #2's phone number using a device associated with the secretary extension 200 on the boss' second line. The monitoring device 132 connects 810 a call between the secretary extension to the party #2. The monitoring device 132 receives 820 an input from the secretary extension to park the call with party #2. For example, the secretary presses the BCA button 327A on a device associated with the secretary extension 200. The monitoring device 132 parks 830 the call with party #2. For example, the monitoring device 132 receives the BCA input from the secretary and parks the call with party #2 responsive to receiving the BCA input. The monitoring device 132 receives 840 a hotline input from the secretary extension. For example, the secretary presses the hotline button 329A requesting a hotline call connection between the secretary extension 200 and the boss extension 100. The monitoring device 132 sends 850 a hotline call to the boss extension. For example, the monitoring device 132 receives the hotline input from the secretary and connects a hotline call between the secretary extension 200 and the boss extension 100 responsive to receiving the hotline input.

A person having ordinary skill in the art will recognize that not all the steps depicted in FIG. 8A are required, and that these steps do not necessarily need to be executed in any particular order. For example, in one embodiment the secretary has party #2 on the line, and the monitoring device 132 receives a hotline input 840 from the secretary. Responsive to receiving this input, the monitoring device automatically parks the call with party #2. Thus, in this embodiment step 820 is not necessary and step 840 occurs before step 830.

Turing now to FIG. 8B, the method 801 continues as the monitoring device 132 receives 860 an input from the boss to answer the hotline call from the secretary. For example, the boss presses the hotline button 315A using a device associated with the boss extension 100. The monitoring device 132 connects 880 a hotline call between the boss extension and the secretary extension. For example, the monitoring device 132 receives the hotline input from the boss and connects the hotline call between the boss extension 100 and the secretary extension 200 responsive to the boss' hotline input. In one embodiment, the hotline call between the boss and the secretary is connected without the boss entering an input. The monitoring device 132 890 receives input from the boss extension or the secretary extension to end the hotline call. For example, either the boss or the secretary enter a second hotline input or press the hook flash on an IP phone or softphone associated with the boss extension 100 or the secretary extension 100 to indicate that the hotline call should be terminated.

Figure 9:
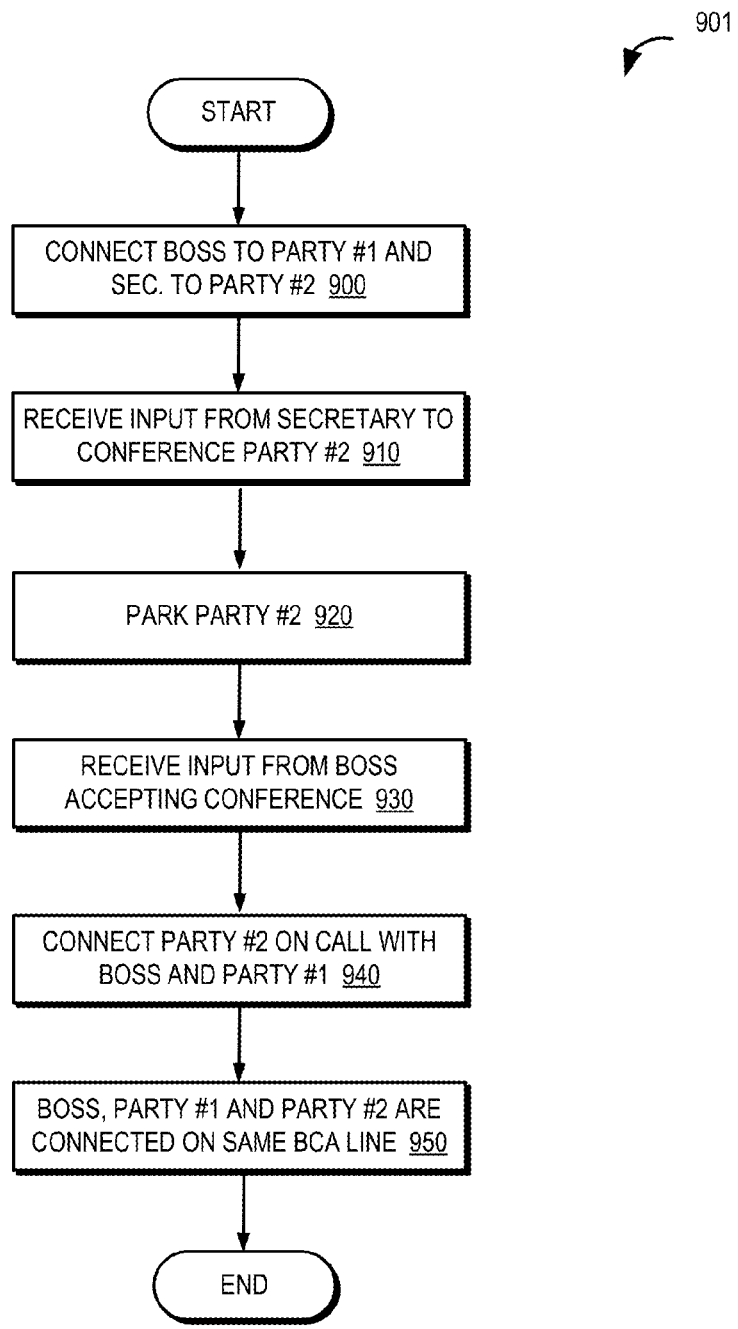
FIG. 9 illustrates a flowchart of a method performed by a monitoring device 132 for enabling secretary to set up a conference call including the boss extension, according to one embodiment of the present invention.

Turing now to FIG. 9, depicted is a flowchart of a method performed by a monitoring device 132 for enabling secretary to set up a conference call including the boss extension, according to one embodiment of the present invention. For example, the method 901 depicted in FIG. 9 corresponds to the apparatus depicted in FIGS. 4A-4D, and is a continuation of the method 801 depicted in FIG. 8.

According to the method 901, the monitoring device 132 connects 900 the boss to party #1 and the secretary to party #2. The boss extension is connected to an ongoing call with the party #1. The monitoring device 132 receives 910 an input from the secretary to connect the party #2 with the ongoing call between the boss extension and the party #1. For example, the secretary presses the BCA button 327A using a device associated with the secretary extension 200 and the monitoring device receives this input. The monitoring device 132 parks 920 the call with party #2 on the bBCA extension. For example, the monitoring device 132 receives the BCA input from the secretary extension and parks the call with party #2 in a call stack position responsive to receiving the BCA input. The monitoring device 132 receives 930 an input from the boss accepting the conference call with party #2. For example, responsive to the secretary entering the BCA input the monitoring device 132 calls the boss extension and a caller identifier ("caller ID") indicates that the call is a conference call with party #2. The boss then presses a BCA button on a device associated with the boss extension 100. The monitoring device 132 connects 940 party #2 on a conference call with the boss extension and party #1. The boss extension, party #1 and party #2 are now connected 950 on the same BCA line. In one embodiment the monitoring device 132 does not require an input 930 in order to complete 940 the conference call. For example, as soon as step 920 is completed, the method moves to step 940 and the conference call is completed.

A person having ordinary skill in the art will recognize that not all the steps depicted in FIG. 9 are required. For example, in one embodiment step 930 is not necessary to build a conference call between the boss, party #1 and party #2. Here, the monitoring device 132 automatically connects the boss and party #1 on the conference call with party #2 responsive to the input provided at step 910.

Figure 10:
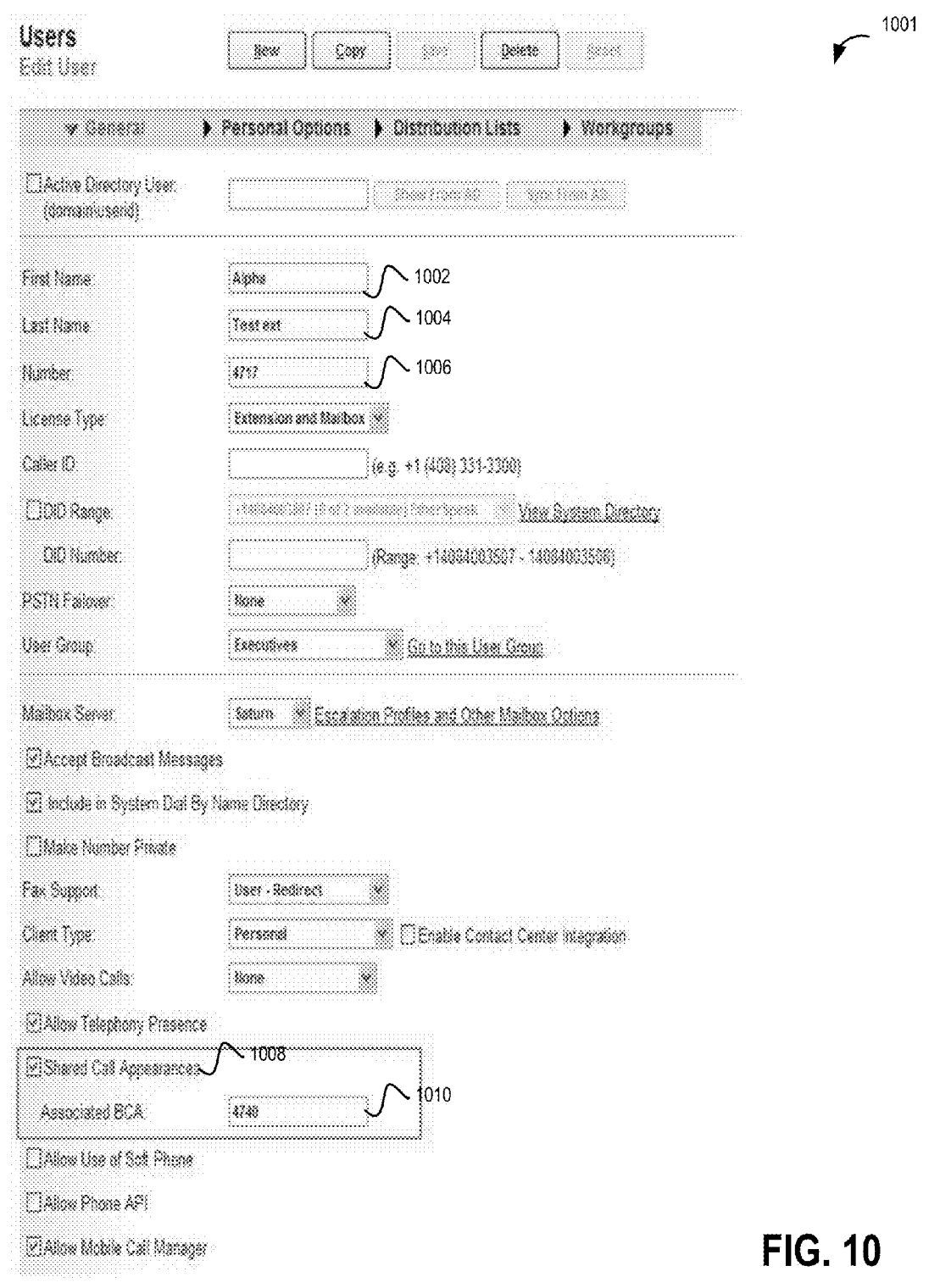

FIG. 10 illustrates screen shot of a graphical user interface 1001 (herein "GUI 1001") for setting up a monitored bridged call appearance (otherwise called a "shared call appearance"), according to one embodiment of the present invention. The configuration module 254 causes the GUI 1001 to be generated on a display associated with a device such as a personal computer. An administrator (or other user) uses the personal computer to provide inputs that are received by the monitoring device 132 and used to set up the monitored bridged call appearance.

The GUI 1001 includes fields and check boxes that an administrator populates to set up a monitored bridged call appearance. In the depicted embodiment, the GUI 1001 includes: a first name field 1002; a last name field 1004; a monitored extension number field 1006; a shared call appearance checkbox 1008; and an associated BCA field 1010. An administrator enters the first name of a user of a monitored extension in the first name field 1002, the last name of the user of the monitored extension in the last name field 1004 and the extension number of the monitored extension in the monitored extension number field. For example, here the first name is "Alpha," the last name is "Test ext" and the extension number of the monitored extension is "4717." The configuration module 254 receives these inputs, stores the inputs in the storage device 258 and configures the monitoring device 132 so that the extension 4717 is a monitored extension associated with a user named "Alpha Test ext."

If the administrator wants to allow the user of the monitored extension to use a shared call stack, the administrator checks the shared call appearance checkbox 1008. Since this box is checked, the configuration module 254 receives this input, stores the input in the storage device 258 and configures the monitoring device 132 so that the monitored extension 4717 shares a call stack with a proxy extension.

The administrator then enters the extension number of the proxy extension in the associated BCA field 1010. For example, here the extension number is 4740. The configuration module 254 receives this input, stores it in the storage device 258 and configures extension 4740 to be the proxy extension for monitored extension 4717. In one embodiment, the associated BCA number is automatically generated by a wizard software application as described above.

Figure 11:
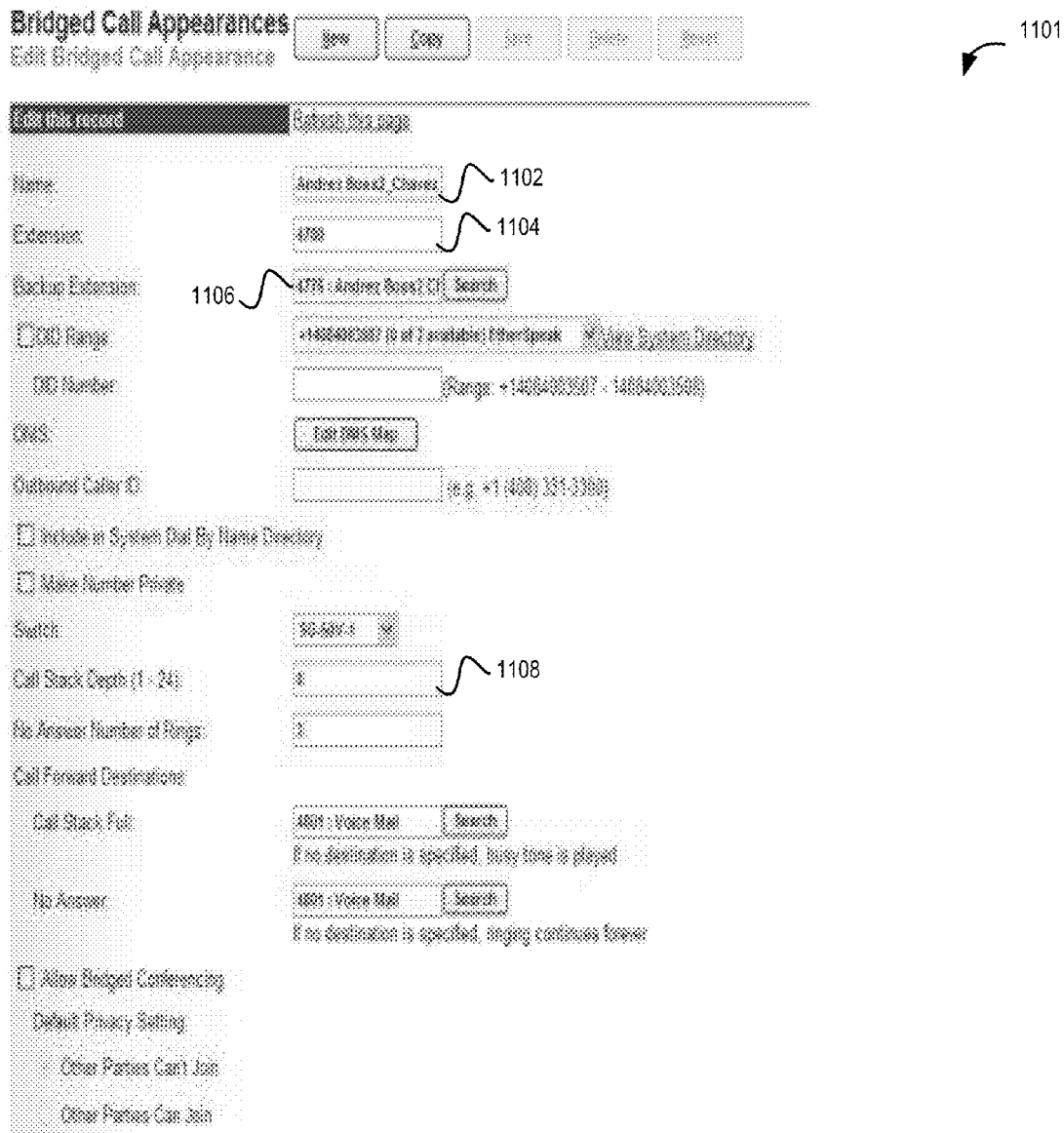
FIG. 11 illustrates a screen shot of a graphical user interface for setting up a monitored extension according to one embodiment of the present invention.

Turning now to FIG. 11, depicted is a screen shot of a GUI 1101 for setting up a bridged call appearance extension according to one embodiment of the present invention. The configuration module 254 causes the GUI 1101 to be generated on a display associated with a personal computer. In the depicted embodiment, the GUI 1101 includes: a name field 1102; a monitored extension number field 1104; a shared extension number field 1106; and a call stack depth field 1108. The administrator enters the name of the monitored extension in field 1102, the extension number of the monitored extension in the monitored extension number field 1104, and the extension number of the shared extension in shared extension number field 1106. For example, in the depicted in embodiment the extension number for the monitored extension is 4780, the number for the shared extension is 4776 and the number of positions on the shared call stack is 8. The configuration module 254 receives these inputs, stores the inputs in the storage device 258 and configures the monitoring device 132 accordingly. In one embodiment, the above-described configuration is automatically generated by a wizard software application as described above based data stored in storage 140 describing the configuration of the monitored extension.

Figure 12:
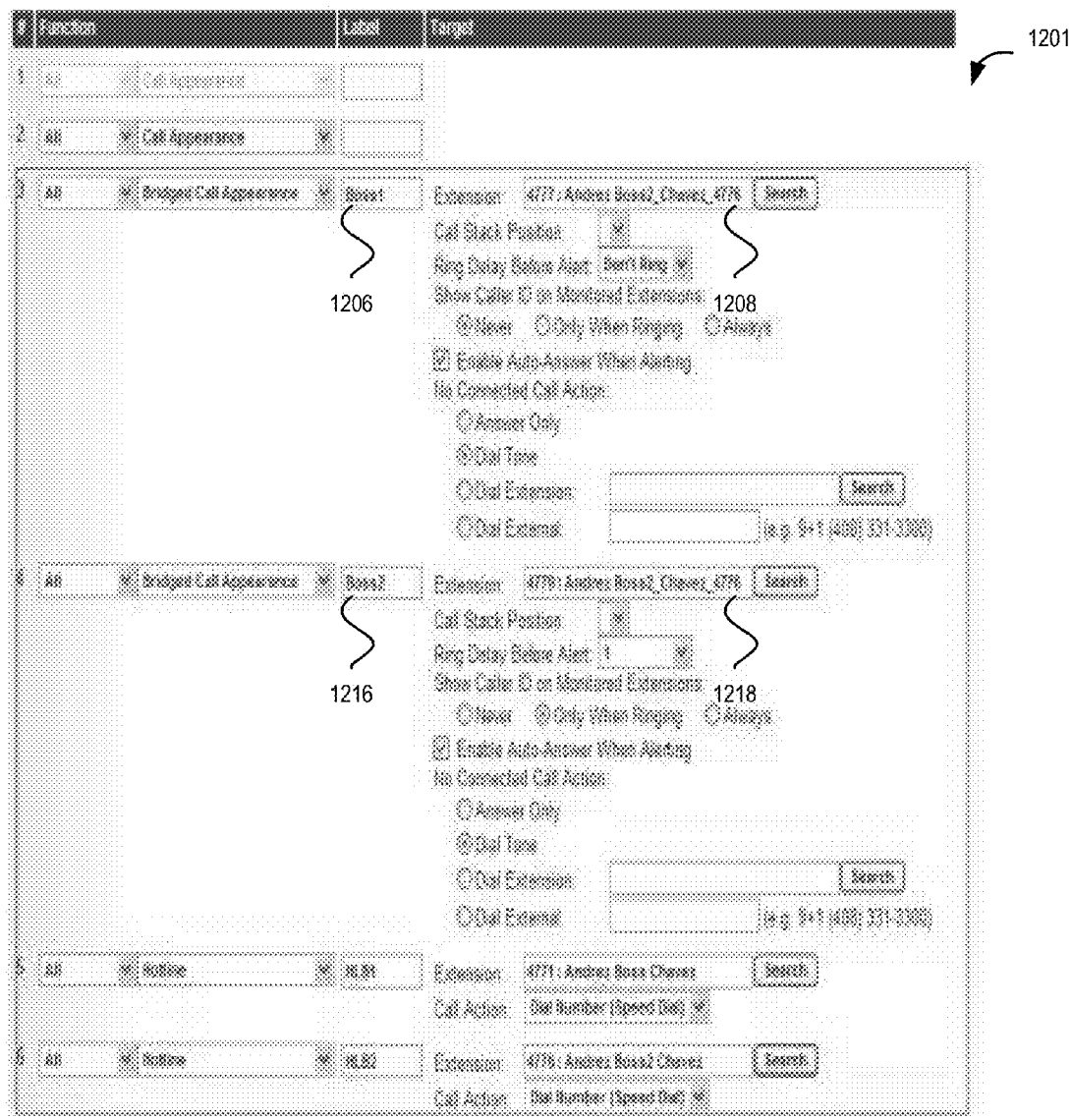
FIG. 12 illustrates a screen shot of a graphical user interface for setting up a proxy extension according to one embodiment of the present invention.

Turning now to FIG. 12, depicted is a screen shot of a GUI 1201 for setting up shared lines on a proxy extension according to one embodiment of the present invention. The GUI 1201 is used to set up shared lines on a proxy extension to be associated with one or more monitored extensions. For example, the proxy extension is a secretary extension associated two boss extensions. The configuration module 254 causes the GUI 1201 to be generated on a display associated with a personal computer. An administrator enters a label for a first BCA extension in field 1206. For example, here the BCA extension is labeled "Boss1." The administrator then defines the association between a monitored extension and a proxy extension by entering an input describing a monitored extension in field 1208. The wizard then automatically picks the BCA extension associated with the monitored extension. Here, the monitored extension is extension number 4776, the BCA extension is 4777 and the proxy extension is extension number 4779. The configuration module 254 receives these inputs, stores them in the storage device 258, and configures the monitoring device 132 so that BCA extension 4777 is a shared with proxy extension 4776.

A second BCA extension is labeled using field 1216, and an association between a second monitored extension and the proxy extension is created using field 1218. Thus, here, the proxy extension 4776 is associated with two monitored extensions similar to FIG. 5C.

Figure 13:
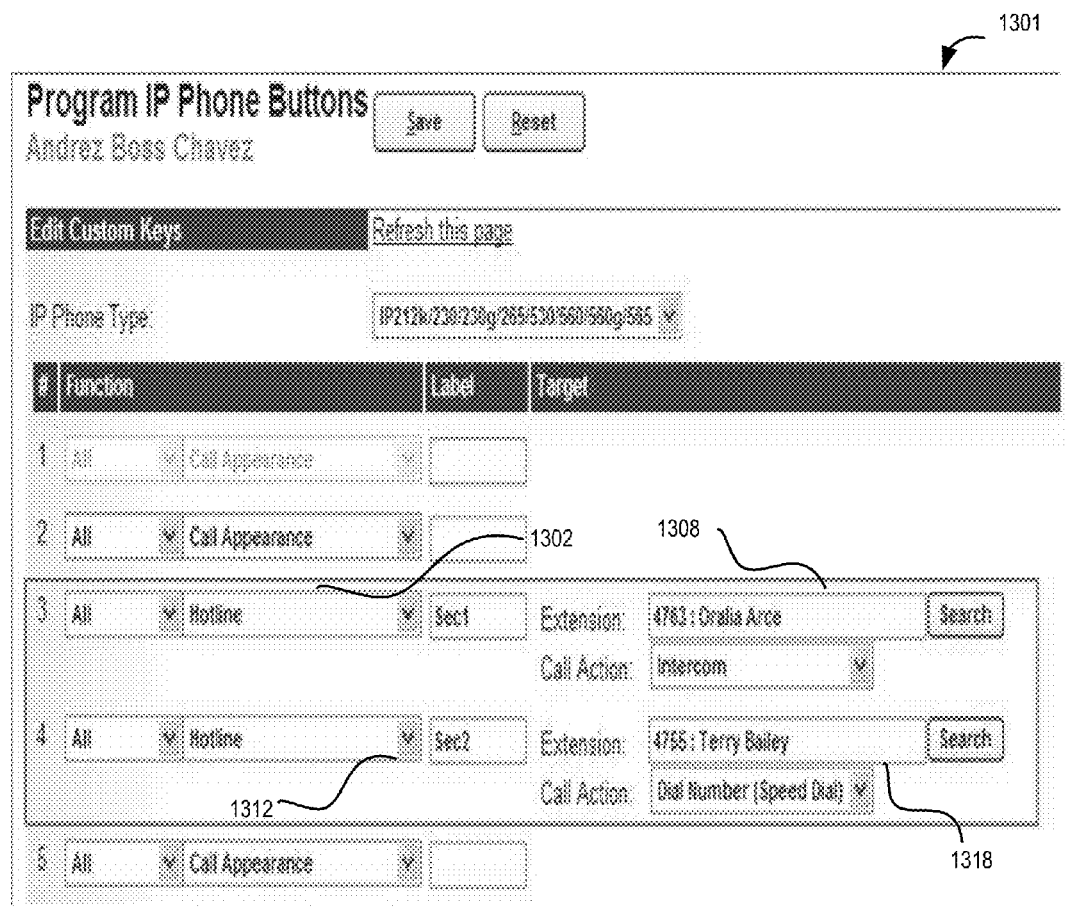
FIG. 13 illustrates a screen shot of a graphical user interface for setting up a hotline targeted from a proxy extension to a monitored extension according to one embodiment of the present invention.

Turning now to FIG. 13, depicted is a screen shot of a GUI 1301 for setting up a hotline targeted from a proxy extension to a monitored extension according to one embodiment of the present invention. For example, the GUI 1301 is used to set up one or more hotlines targeted from a proxy extension to one or more monitored extensions. The configuration module 254 causes the GUI 1301 to be generated on a display associated with a personal computer. An administrator selects the hotline function from dropdown box 1302. The administrator then enters a monitored extension in field 1308. The hotline is targeted from the proxy extension to the monitored extension defined by field 1308. For example, here the hotline is targeted to extension 4763. The administrator repeats this process using dropdown box 1312 and field 1318 if the proxy extension is to be configured to have two hotlines. For example, here the proxy extension is configured to have a second hotline to monitored extension 4755. The configuration module 254 receives these inputs, stores them in the storage device 258, and configures the monitoring device 132 so that the proxy extension has a first hotline targeted to monitored extension 4763 and a second hotline targeted to monitored extension 4755.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for sharing a portion of a call stack in a communications system, the method comprising:
    redirecting, using a monitoring device, an incoming call for a monitored extension to a shared extension that is associated with the monitored extension, the shared extension having a call stack with a call stack position that is shared with a proxy extension; and
    making, using the monitoring device, the incoming call available as a call option for the monitored extension and, based on the incoming call having the call stack position that is shared with the proxy extension, making the incoming call available as a call option for the proxy extension so that the monitored extension and the proxy extension can perform a call function on the incoming call and the incoming call for the monitored extension can be moved into and out of the shared portion of the call stack.

2. The method of claim 1, wherein the call function comprises answering, transferring or redirecting the incoming call, and the proxy extension performs the call function on the incoming call for the monitored extension using the shared extension.

3. The method of claim 1, wherein the proxy extension uses the shared extension to change call handling modes for the monitored extension.

4. The method of claim 1, wherein a call available on the shared call stack position is viewable simultaneously on (1) a first display of a first device associated with the monitored extension and (2) a second display of a second device associated with the proxy extension.

5. The method of claim 1, further comprising a hotline between the proxy extension and the monitored extension.

6. The method of claim 1, wherein the shared call stack comprises a plurality of call stack positions and more than one call stack position is shared with the proxy extension.

7. The method of claim 6, wherein at least one of the call stack positions is not shared with the proxy extension.

8. The method of claim 6, wherein the incoming call is a first call from a first party, and further comprising:
    receiving an input from the proxy extension to call a second party;
    receiving an input from the proxy extension to park the call with the second party on the shared extension; and
    receiving an input from the proxy extension to connect the second party on a conference call with a user of the monitored extension and the first party.

9. An apparatus for sharing a call available on a shared call stack in a communications system, the apparatus comprising:
    an extension monitor module for redirecting an incoming call for a monitored extension to a shared extension that is associated with the monitored extension, the shared extension having a call stack with a call stack position that is shared with a proxy extension, the incoming call for the monitored extension capable of being moved into and out of the shared portion of the call stack; and
    a bridged call appearance module ("BCA module") coupled to the extension monitor for making the incoming call available as a call option for the monitored extension and, based on the incoming call having the call stack position that is shared with the proxy extension, making the incoming call available for the proxy extension so that the monitored extension and the proxy extension can perform a call function on the incoming call.

10. The apparatus of claim 9, wherein the call function comprises answering the incoming call and the proxy extension answers the incoming call for the monitored extension using the shared extension.

11. The apparatus of claim 9, wherein the monitored extension is a boss extension and the proxy extension is a secretary extension.

12. The apparatus of claim 9, further comprising a hotline module for maintaining a hotline between the proxy extension and the monitored extension.

13. The apparatus of claim 9, wherein the incoming call is a first call from a first party, and further comprising:
    receiving an input from the proxy extension to call a second party;
    receiving an input from the proxy extension to park the call with the second party on the shared extension; and
    receiving an input from the proxy extension to connect the second party on a conference call with a user of the monitored extension and the first party.

14. The apparatus of claim 9, wherein the call stack comprises a plurality of call stack positions and more than one call stack position is shared with the proxy extension.

15. The apparatus of claim 9, wherein the BCA module is coupled to receive an input from the proxy extension and, responsive to this input, cause a device associated with the proxy extension to display a call history associated with the monitored extension.

16. The apparatus of claim 9, wherein the BCA module is coupled to receive an input from the proxy extension and, responsive to this input, cause the proxy extension to change a call handling mode of the monitored extension.

17. The apparatus of claim 13, wherein at least one of the call stack positions is not shared with the proxy extension.

18. The apparatus of claim 9, further comprising a configuration module for designating call stack positions in the call stack as private, semiprivate or public.

19. The apparatus of claim 18, wherein a call stack position designated as private is accessible by the monitored extension and not accessible by any other extension.

20. The apparatus of claim 18, wherein a call stack position designated as semiprivate is accessible by the monitored extension and selected proxy extensions.

21. The apparatus of claim 18, wherein call stack position designated as public is accessible by the monitored extension and a plurality of other proxy extensions.

\* \* \* \* \*